US011323190B2

United States Patent
Leng et al.

(10) Patent No.: US 11,323,190 B2
(45) Date of Patent: May 3, 2022

(54) RADIO FREQUENCY CHANNEL CONNECTION DETECTION METHOD AND APPARATUS

(71) Applicant: Huawei Technologies Co., Ltd., Shenzhen (CN)

(72) Inventors: Shun Leng, Dongguan (CN); Jian Min, Dongguan (CN); Yun Feng, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 16/913,785

(22) Filed: Jun. 26, 2020

(65) Prior Publication Data

US 2020/0328831 A1 Oct. 15, 2020

Related U.S. Application Data

(63) Continuation of application No. PCT/CN2017/120136, filed on Dec. 29, 2017.

(51) Int. Cl.
*H04B 17/318* (2015.01)
*H04L 5/00* (2006.01)
(Continued)

(52) U.S. Cl.
CPC ......... *H04B 17/318* (2015.01); *H04L 5/0051* (2013.01); *H04W 24/08* (2013.01); *H04W 24/10* (2013.01)

(58) Field of Classification Search
CPC .... H04B 17/318; H04L 5/0051; H04W 24/08; H04W 24/10
See application file for complete search history.

(56) References Cited

U.S. PATENT DOCUMENTS 6,456,627 B1 * 9/2002 Frodigh .............. H04B 7/2628 370/465
11,038,280 B2 * 6/2021 Zhao .................... H04B 17/21
(Continued)

FOREIGN PATENT DOCUMENTS

CN 101325752 A 12/2008
CN 101447836 A 6/2009
(Continued)

OTHER PUBLICATIONS

"3rd Generation Partnership Project; Technical Specification Group Radio Access Network; Evolved Universal Terrestrial Radio Access (E-UTRA) and Universal Terrestrial Radio Access (UTRA; Radio Frequency (RF) requirement background for Active Antenna System (AAS) Base Station (BS)(Release 13)," 3GPP TR 37.842 V13.2.0, 131 pages, 3rd Generation Partnership Project, Valbonne, France (Mar. 2017).

*Primary Examiner* — Duc C Ho
(74) *Attorney, Agent, or Firm* — Leydig, Voit & Mayer, Ltd.

(57) ABSTRACT

Radio frequency channel connection detection methods and apparatus, to detect a connection mode between a radio frequency channel and an antenna, thereby reducing difficulty in secondary onsite construction, and improving construction efficiency. The method includes: receiving, by a first radio frequency unit by using each of N to-be-detected radio frequency channels, signals sent by using at least one of N reference radio frequency channels of a reference radio frequency unit; and determining a connection relationship between the N to-be-detected radio frequency channels and N antennas based on the signals received by using each to-be-detected radio frequency channel.

19 Claims, 12 Drawing Sheets

(51) Int. Cl.
*H04W 24/08* (2009.01)
*H04W 24/10* (2009.01)

(56) References Cited

U.S. PATENT DOCUMENTS

2009/0079879 A1* 3/2009 Adachi .................. H04N 5/50
                                                         348/725
2015/0327087 A1   11/2015 Xu et al.

FOREIGN PATENT DOCUMENTS

| | | |
|---|---|---|
| CN | 106804044 A | 6/2017 |
| CN | 105379014 B | 4/2018 |
| EP | 3043524 A1 | 7/2016 |
| JP | 2008098982 A | 4/2008 |
| JP | 2009272968 A | 11/2009 |
| JP | 2017143460 A | 8/2017 |
| JP | 2017169173 A | 9/2017 |
| KR | 20140100932 A | 8/2014 |
| WO | 2014180517 A1 | 11/2014 |
| WO | 2014198233 A1 | 12/2014 |
| WO | 2017000552 A1 | 1/2017 |

* cited by examiner

Schematic diagram of a beam coverage range when a connection relationship is correct Schematic diagram of a beam coverage range when a connection relationship is incorrect

| Reference radio frequency channel | Reference radio frequency channel 1 | Reference radio frequency channel 2 | Reference radio frequency channel 3 | Reference radio frequency channel 4 |
|---|---|---|---|---|
| | Send a signal | Send no signal | Send no signal | Send no signal |
| To-be-detected radio frequency channel | To-be-detected radio frequency channel 1 | To-be-detected radio frequency channel 2 | To-be-detected radio frequency channel 3 | To-be-detected radio frequency channel 4 |
| | Receive a signal | Receive a signal | Receive a signal | Receive a signal |
| Signal strength | Strongest | Weak | Weak | Weak |

FIG. 7

| Reference radio frequency channel | Reference radio frequency channel 1 | Reference radio frequency channel 2 | Reference radio frequency channel 3 | Reference radio frequency channel 4 |
|---|---|---|---|---|
| | Send a signal | Send no signal | Send no signal | Send no signal |
| To-be-detected radio frequency channel | To-be-detected radio frequency channel 1 | To-be-detected radio frequency channel 2 | To-be-detected radio frequency channel 3 | To-be-detected radio frequency channel 4 |
| | Receive a signal | Receive a signal | Receive a signal | Receive a signal |
| Signal strength | Weak | Strongest | Weak | Weak |

FIG. 8

| Reference radio frequency channel | Reference radio frequency channel 1 | Reference radio frequency channel 2 | Reference radio frequency channel 3 | Reference radio frequency channel 4 |
|---|---|---|---|---|
| | Send a feature signal 1 | Send a feature signal 2 | Send a feature signal 3 | Send a feature signal 4 |
| To-be-detected radio frequency channel | To-be-detected radio frequency channel 1 | To-be-detected radio frequency channel 2 | To-be-detected radio frequency channel 3 | To-be-detected radio frequency channel 4 |
| | Receive the feature signal 1 and other interference signals | Receive the feature signal 2 and other interference signals | Receive the feature signal 3 and other interference signals | Receive the feature signal 4 and other interference signals |
| Signal strength | The feature signal 1 is the strongest | The feature signal 2 is the strongest | The feature signal 3 is the strongest | The feature signal 4 is the strongest |

FIG. 10

| Reference radio frequency channel | Reference radio frequency channel 1 | Reference radio frequency channel 2 | Reference radio frequency channel 3 | Reference radio frequency channel 4 |
|---|---|---|---|---|
| | Send a feature signal 1 | Send a feature signal 2 | Send a feature signal 3 | Send a feature signal 4 |
| To-be-detected radio frequency channel | To-be-detected radio frequency channel 1 | To-be-detected radio frequency channel 2 | To-be-detected radio frequency channel 3 | To-be-detected radio frequency channel 4 |
| | Receive the feature signal 2 and other interference signals | Receive the feature signal 1 and other interference signals | Receive the feature signal 3 and other interference signals | Receive the feature signal 4 and other interference signals |
| Signal strength | The feature signal 2 is the strongest | The feature signal 1 is the strongest | The feature signal 3 is the strongest | The feature signal 4 is the strongest |

RADIO FREQUENCY CHANNEL CONNECTION DETECTION METHOD AND APPARATUS

CROSS-REFERENCE TO RELATED APPLICATIONS

This application is a continuation of International Application No. PCT/CN2017/120136, filed on Dec. 29, 2017. the disclosure of which is hereby incorporated by reference in its entirety.

TECHNICAL FIELD

The present disclosure relates to the field of antenna technologies, and in particular, to a radio frequency channel connection detection method and apparatus.

BACKGROUND

In an existing wireless communications network, an active antenna unit (AAU) is usually used to replace a plurality of common antennas, to reduce difficulty in site selection and property coordination. In addition, cluster cable design is used to obtain 30% to 70% capacity gains when 70% space is saved. The AAU includes an antenna unit (AU) and an active radio frequency unit (RU). The active radio frequency unit may also be referred to as an active module, and the antenna unit may also be referred to as an antenna module. A quantity of ports of the antenna unit may be expanded by using an internally integrated combiner, to connect to more radio frequency modules. For example, increased ports may include an active port configured to connect to the active radio frequency unit and a passive port configured to connect to a passive radio unit, for example, a remote radio unit (RRU). A specific structure is shown in FIG. 1 and FIG. 2. When a plurality of antennas are used, amplitudes and phases of signals on different radio frequency channels are adjusted. Connection relationships between a radio frequency channel of the active RU and each antenna in the antenna unit and between a radio frequency channel of the passive RU and each antenna in the antenna unit need to be determined. In other words, a correspondence between the radio frequency channel of the active RU and the radio frequency channel of the passive RU also needs to be determined. In actual operations, a connection relationship between the active RU of the AAU and an antenna port of the AAU may be established during production. Therefore, the connection relationship is determined and correct. However, when the radio frequency channel of the passive RU (for example, the RRU) is connected to the active port, manual operation is usually required. In this case, the radio frequency channel and the antenna unit may be connected incorrectly. If cables between the passive RU and the antenna unit are connected in an incorrect sequence, beamforming is inaccurate or even incorrect. Consequently, network coverage changes and network performance deteriorates, as shown in FIG. 3.

When cables between the passive RU and the antenna unit AU of the active antenna unit AAU are connected in an incorrect sequence and the connection sequence needs to be corrected, maintenance personnel cannot quickly determine an incorrectly connected cable, and construction efficiency cannot be guaranteed.

SUMMARY

Embodiments of this application provide a radio frequency channel connection detection method and apparatus, to detect a connection mode between a radio frequency channel and an antenna, thereby reducing difficulty in secondary onsite construction is reduced, and improving construction efficiency.

A first aspect of this application provides a radio frequency channel connection detection method. The method includes: receiving, by using each of N to-be-detected radio frequency channels, signals sent by using at least one of N reference radio frequency channels, where N is an integer greater than or equal to 2; and determining a connection relationship between the N to-be-detected radio frequency channels and N antennas based on the signals received by using each to-be-detected radio frequency channel, where any one of the N to-be-detected radio frequency channels and one of the N reference radio frequency channels are connected to one of the N antennas by using a combiner apparatus, and the to-be-detected radio frequency channels are connected to different reference radio frequency channels and different antennas. Optionally, the N to-be-detected radio frequency channels belong to a first radio frequency unit. Optionally, the N reference radio frequency channels belong to a reference radio frequency unit. Optionally, determining the connection relationship between the N to-be-detected radio frequency channels and the N antennas may be performed by the first radio frequency unit, or may be performed by another apparatus or device, for example, a baseband unit connected to the N to-be-detected radio frequency channels. In this embodiment of this application, when a connection relationship between a to-be-detected radio frequency channel and an antenna is incorrect and secondary construction needs to be performed, an error existing during configuration of the connection relationship may be automatically detected, to reduce difficulty in secondary onsite construction and improve construction efficiency.

In a first implementation of the first aspect of the embodiments of this application, the determining a connection relationship between the N to-be-detected radio frequency channels and N antennas based on the signals received by using each to-be-detected radio frequency channel includes: determining a connection relationship between at least one of the N to-be-detected radio frequency channels and at least one of the N reference radio frequency channels based on the signals received by using each to-be-detected radio frequency channel; and determining the connection relationship between the N to-be-detected radio frequency channels and the N antennas based on the connection relationship between the at least one of the N to-be-detected radio frequency channels and the at least one of the N reference radio frequency channels.

In a possible design, in a second implementation of the first aspect of the embodiments of this application, the method further includes: sequentially sending signals by using the N reference radio frequency channels; and the receiving, by a first radio frequency unit by using each of N to-be-detected radio frequency channels, signals sent by using at least one of N reference radio frequency channels of a reference radio frequency unit includes: sequentially receiving, by the first radio frequency unit by using each of the N to-be-detected radio frequency channels, the signals sent by using the N reference radio frequency channels. In some scenarios, in a detection manner in which signals are sequentially sent by using different reference radio frequency channels, a quantity of times for sending signals can be reduced. For example, the connection relationship between the N to-be-detected radio frequency channels and the N antennas can be determined only after the signals are sent by using the N−1 reference radio frequency channels. When it is determined that some of the N to-be-detected radio frequency channels are correctly connected, some reference radio frequency channels may be further selected to send signals for some of the to-be-detected radio frequency channels that are correctly connected. In addition, sending signals on separate reference radio frequency channels can reduce interference between the signals, so that a strength of a signal on the to-be-detected radio frequency channel is more accurately determined.

In a possible design, in a third implementation of the first aspect of the embodiments of this application, the determining a connection relationship between the N to-be-detected radio frequency channels and N antennas based on the signals received by using each to-be-detected radio frequency channel includes: determining a connection relationship between one of the N to-be-detected radio frequency channels and one of the N reference radio frequency channels based on a signal strength of a signal that is sent by using the reference radio frequency channel and that is received by using each to-be-detected radio frequency channel, where a to-be-detected radio frequency channel on which a received signal has the strongest signal strength is connected to the reference radio frequency channel, and the to-be-detected radio frequency channel is connected to an antenna that is connected to the reference radio frequency channel. When a connection relationship between radio frequency channels is determined based on a signal strength, a signal processing process is simplified, and the detection method is simpler and easier to implement.

In a possible design, in a fourth implementation of the first aspect of the embodiments of this application, the method further includes: simultaneously sending signals by using the N reference radio frequency channels, where a feature of a signal sent by using any one of the N reference radio frequency channels is different from a feature of a signal sent by using another one of the N reference radio frequency channels; and the receiving, by a first radio frequency unit by using each of N to-be-detected radio frequency channels, signals sent by using at least one of N reference radio frequency channels of a reference radio frequency unit includes: receiving, by the first radio frequency unit by using each of the N to-be-detected radio frequency channels, the signals simultaneously sent by using the N reference radio frequency channels. When the signals are simultaneously sent by using the N reference radio frequency channels, a time required for retrieval can be shortened, and detection efficiency can be improved.

In a possible design, in a fifth implementation of the first aspect of the embodiments of this application, the determining a connection relationship between the N to-be-detected radio frequency channels and N antennas based on the signals received by using each to-be-detected radio frequency channel includes: determining a connection relationship between one of the N to-be-detected radio frequency channels and one of the N reference radio frequency channels based on signal strengths of signals that are in the signals received by using each to-be-detected radio frequency channel and that have a same feature, where a to-be-detected radio frequency channel by using which a signal having the strongest signal strength in the signals having the same feature is received is connected to the reference radio frequency channel, and the to-be-detected radio frequency channel is connected to an antenna that is connected to the reference radio frequency channel.

In a possible design, in a sixth implementation of the first aspect of the embodiments of this application, after the receiving, by a first radio frequency unit by using each of N to-be-detected radio frequency channels, signals sent by using at least one of N reference radio frequency channels of a reference radio frequency unit, the method further includes: sending, by the first radio frequency unit, the signals received by using each to-be-detected radio frequency channel to a baseband unit connected to the first radio frequency unit; and the determining a connection relationship between the N to-be-detected radio frequency channels and N antennas based on the signals received by using each to-be-detected radio frequency channel includes: determining, by the baseband unit, the connection relationship between the N to-be-detected radio frequency channels and the N antennas based on the signals received by using each to-be-detected radio frequency channel.

In a possible design, in a seventh implementation of the first aspect of the embodiments of this application, the reference radio frequency unit is an active radio frequency unit, and the first radio frequency unit is a passive radio frequency unit; or both the reference radio frequency unit and the first radio frequency unit are passive radio frequency units. The embodiments of this application may be applied to a scenario in which any type of radio frequency units are combined and connected to a same antenna unit.

In a possible design, in an eighth implementation of the first aspect of the embodiments of this application, the reference radio frequency unit and the first radio frequency unit are connected to a same baseband unit. When the reference radio frequency unit and the first radio frequency unit are connected to a same baseband unit, the baseband unit may conveniently control sending of a signal on a reference radio frequency channel, signal receiving on a to-be-detected radio frequency channel, and a connection relationship between the to-be-detected radio frequency channel and an antenna. Certainly, the reference radio frequency unit and the first radio frequency unit may also be connected to different baseband units. In this case, the baseband units need to communicate with each other, to transfer messages such as a signal sending sequence and a signal receiving result, to detect a connection relationship between a to-be-detected radio frequency channel and an antenna.

A second aspect of this application provides a radio frequency channel connection detection apparatus, including N to-be-detected radio frequency channels. Any one of the N to-be-detected radio frequency channels and one of N reference radio frequency channels are connected to one of N antennas by using a combiner apparatus, the to-be-detected radio frequency channels are connected to different reference radio frequency channels and different antennas, and N is an integer greater than or equal to 2; each of the N to-be-detected radio frequency channels is configured to receive signals sent by using at least one of the N reference radio frequency channels; and the radio frequency channel connection detection apparatus further includes a processor, where the processor is connected to the N to-be-detected radio frequency channels, and is configured to determine a connection relationship between the N to-be-detected radio frequency channels and the N antennas based on the signals received by using each to-be-detected radio frequency channel. Optionally, the radio frequency channel connection detection apparatus includes a first radio frequency unit, and the N to-be-detected radio frequency channels belong to the first radio frequency unit. The processor may be disposed in the first radio frequency unit, or may be deployed as an independent component or module, or may be deployed in another component or apparatus configured to detect a connection relationship between a radio frequency channel and an antenna, for example, deployed in a tool device specially configured to detect a connection to a radio frequency channel, or deployed in a baseband unit connected to the N to-be-detected radio frequency channels. In this embodiment of this application, when a connection relationship between a to-be-detected radio frequency channel and an antenna is incorrect and secondary construction needs to be performed, an error existing during configuration of in the connection relationship may be automatically detected, to reduce difficulty in secondary onsite construction and improve construction efficiency.

In a possible design, in a first implementation of the second aspect of the embodiments of this application, the processor is further configured to: determine a connection relationship between at least one of the N to-be-detected radio frequency channels and at least one of the N reference radio frequency channels based on the signals received by using each to-be-detected radio frequency channel; and determine the connection relationship between the N to-be-detected radio frequency channels and the N antennas based on the connection relationship between the at least one of the N to-be-detected radio frequency channels and the at least one of the N reference radio frequency channels.

In a possible design, in a second implementation of the second aspect of the embodiments of this application, the radio frequency channel connection detection apparatus further includes the N reference radio frequency channels, and the N reference radio frequency channels are configured to sequentially send signals; and each of the N to-be-detected radio frequency channels is further configured to sequentially receive the signals sent by using the N reference radio frequency channels. Optionally, the radio frequency channel connection detection apparatus includes a reference radio frequency unit, and the N reference radio frequency channels belong to the reference radio frequency unit.

In a possible design, in a third implementation of the second aspect of the embodiments of this application, the processor is specifically configured to: determine a connection relationship between one of the N to-be-detected radio frequency channels and one of the N reference radio frequency channels based on a signal strength of a signal that is sent by using the reference radio frequency channel and that is received by using each to-be-detected radio frequency channel, where a to-be-detected radio frequency channel on which a received signal has the strongest signal strength is connected to the reference radio frequency channel, and the to-be-detected radio frequency channel is connected to an antenna that is connected to the reference radio frequency channel.

In a possible design, in a fourth implementation of the second aspect of the embodiments of this application, the radio frequency channel connection detection apparatus further includes the N reference radio frequency channels, and the N reference radio frequency channels are configured to simultaneously send signals, where a feature of a signal sent by using any one of the N reference radio frequency channels is different from a feature of a signal sent by using another one of the N reference radio frequency channels; and each of the N to-be-detected radio frequency channels is specifically configured to receive the signals simultaneously sent by using the N reference radio frequency channels. Optionally, the radio frequency channel connection detection apparatus includes a reference radio frequency unit, and the N reference radio frequency channels belong to the reference radio frequency unit.

In a possible design, in a fifth implementation of the second aspect of the embodiments of this application, the processor is specifically configured to: determine a connection relationship between one of the N to-be-detected radio frequency channels and one of the N reference radio frequency channels based on signal strengths of signals that are in the signals received by using each to-be-detected radio frequency channel and that have a same feature, where a to-be-detected radio frequency channel by using which a signal having the strongest signal strength in the signals having the same feature is received is connected to the reference radio frequency channel, and the to-be-detected radio frequency channel is connected to an antenna that is connected to the reference radio frequency channel.

In a possible design, in a sixth implementation of the second aspect of the embodiments of this application, the radio frequency channel connection detection apparatus further includes a baseband unit, where the baseband unit includes the processor, a memory, and a communications interface, and the baseband unit is connected to the N to-be-detected radio frequency channels by using the communications interface; the memory is coupled to the processor, and is configured to store a program and/or an instruction that are/is to be executed by the processor; the communications interface is configured to receive a signal sent by each to-be-detected radio frequency channel; and each to-be-detected radio frequency channel is further configured to send the received signals to the baseband unit.

In a possible design, in a seventh implementation of the second aspect of the embodiments of this application, the first radio frequency unit is a passive radio frequency unit.

In a possible design, in an eighth implementation of the second aspect of the embodiments of this application, the reference radio frequency unit is an active radio frequency unit or a passive radio frequency unit.

In a possible design, in a ninth implementation of the second aspect of the embodiments of this application, the N reference radio frequency channels and the N to-be-detected radio frequency channels are connected to a same baseband unit.

A third aspect of this application provides a computer-readable storage medium. The computer-readable storage medium stores an instruction. When the instruction is run on a computer, the computer is configured to perform the method according to the foregoing aspect.

A fourth aspect of this application provides a computer program product including an instruction. When the computer program product is run on a computer, the computer is configured to perform the method according to the foregoing aspect.

In the technical solutions provided in the embodiments of this application, the one or more signals sent by using the at least one of the N reference radio frequency channels are received by using each of the N to-be-detected radio frequency channels, where N is an integer greater than or equal to 2; and the connection relationship between the N to-be-detected radio frequency channels and the N antennas is determined based on the signals received by using each to-be-detected radio frequency channel, where any one of the N to-be-detected radio frequency channels and one of the N reference radio frequency channels are connected to one of the N antennas by using the combiner apparatus, and the to-be-detected radio frequency channels are connected to different reference radio frequency channels and different antennas. In the embodiments of this application, when a connection relationship between a radio frequency channel and an antenna is incorrect and secondary construction needs to be performed, an error existing during configuration of in the connection relationship may be automatically detected, to reduce difficulty in secondary onsite construction and improve construction efficiency.

BRIEF DESCRIPTION OF DRAWINGS

FIG. 7 is a schematic diagram of a connection of a reference radio frequency channel and a to-be-detected radio frequency channel according to an embodiment of this application;

FIG. 8 is a schematic diagram of another connection of a reference radio frequency channel and a to-be-detected radio frequency channel according to an embodiment of this application;

FIG. 10 is a schematic diagram of another connection of a reference radio frequency channel and a to-be-detected radio frequency channel according to an embodiment of this application;

FIG. 11 is a schematic diagram of another connection of a reference radio frequency channel and a to-be-detected radio frequency channel according to an embodiment of this application;

DESCRIPTION OF EMBODIMENTS

Embodiments of this application provide a radio frequency channel connection detection method and apparatus, to detect a connection mode between a radio frequency channel and an antenna, thereby reducing difficulty in secondary onsite construction, and improving construction efficiency.

The following describes the embodiments of this application with reference to the accompanying drawings in the embodiments of this application.

In the specification, claims, and accompanying drawings of this application, the terms "first", "second", "third", "fourth", and so on (if existent) are intended to distinguish similar objects but do not necessarily indicate a specific order or sequence. It should be understood that the data termed in such a way are interchangeable in proper circumstances so that the embodiments described herein can be implemented in other orders than the content illustrated or described herein. In addition, the terms "include", "have" and any other variants mean to cover the non-exclusive inclusion, for example, a process, method, system, product, or device that includes a list of steps or units is not necessarily limited to those steps or units that are clearly listed, but may include other steps or units not expressly listed or inherent to such a process, method, product, or device.

Figure 4:
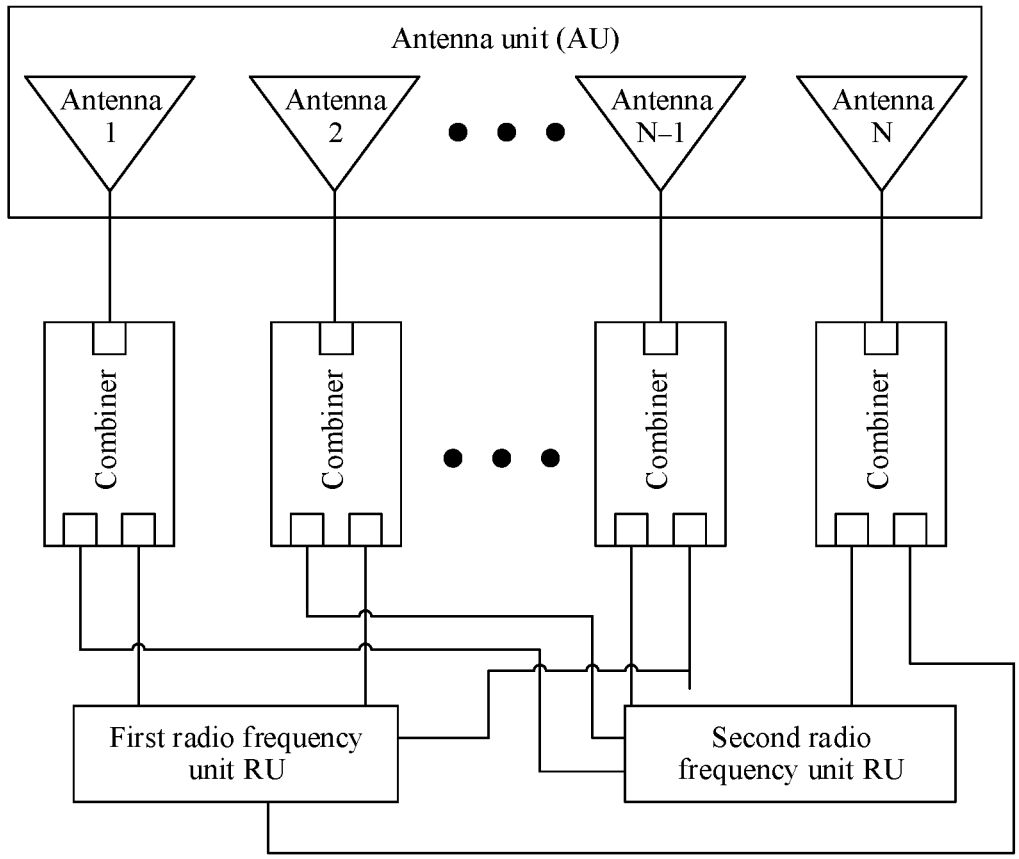
FIG. 4 is a schematic diagram of an application scenario of a radio frequency channel connection detection method according to an embodiment of this application.

The embodiments of this application may be applied to an application scenario shown in FIG. 4. In this application scenario, an antenna unit (AU) is connected to one or more radio frequency units RUs, where the antenna unit includes N antennas, and N is an integer greater than or equal to 2. A plurality of radio frequency units are separately connected to the antennas of the antenna unit by using a combiner. If a connection relationship between one radio frequency unit and the antennas of the antenna units is correct, whether a connection relationship between another radio frequency unit and the antennas of the antenna unit is correct may be determined based on the connection relationship for the radio frequency unit. For example, as shown in FIG. 4, the antenna unit is connected to two radio frequency units: a first radio frequency unit and a second radio frequency unit. Each radio frequency channel of the first radio frequency unit is connected to each antenna in the antenna unit, and each radio frequency channel of the second radio frequency unit is connected to each antenna in the antenna unit. The first radio frequency unit may be a reference radio frequency unit, and the second radio frequency unit may be a to-be-detected radio frequency unit.

Figure 1:
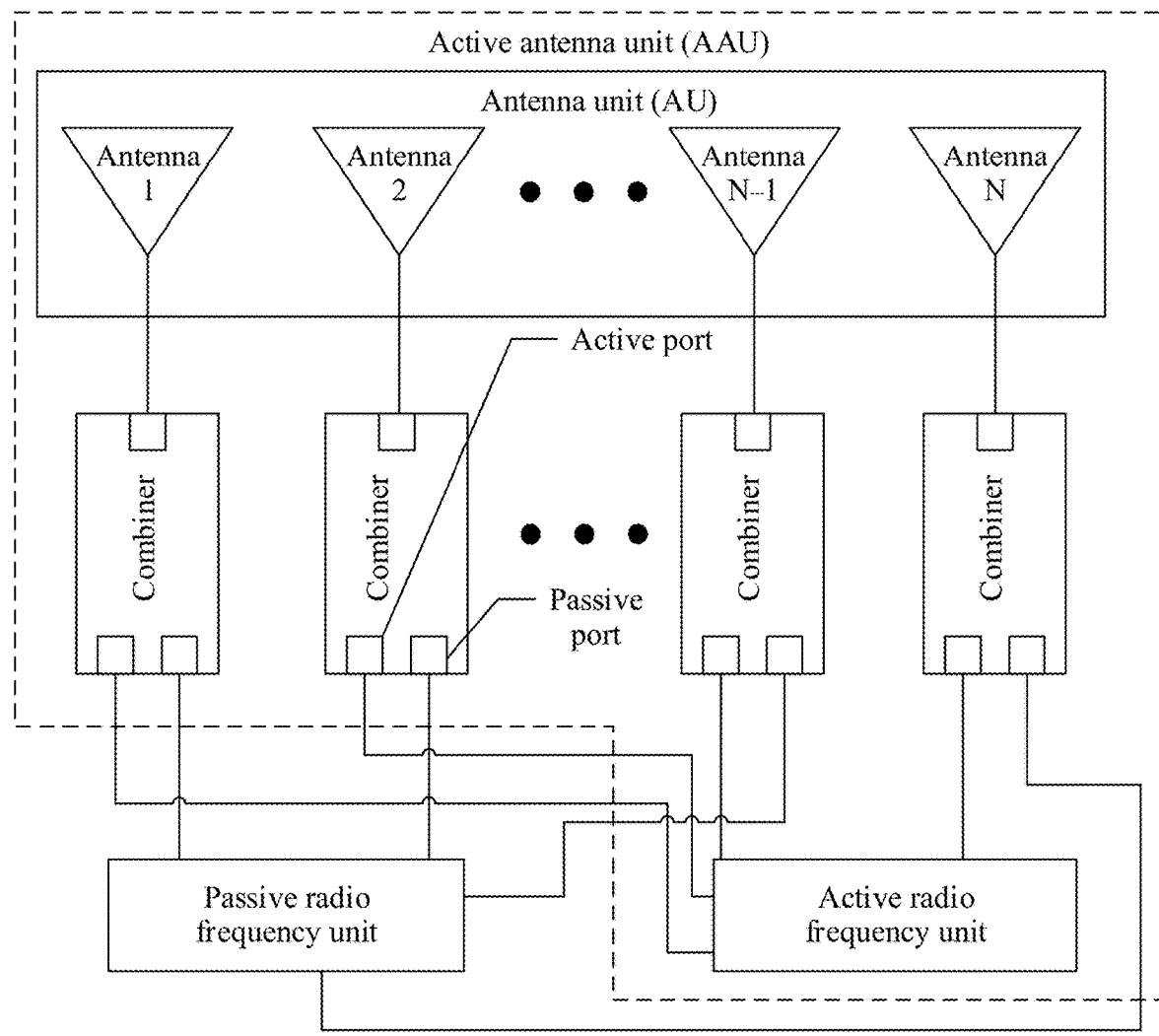
FIG. 1 is a schematic diagram of a connection between an active antenna unit and a passive radio frequency unit according to an embodiment of this application.
Figure 2:
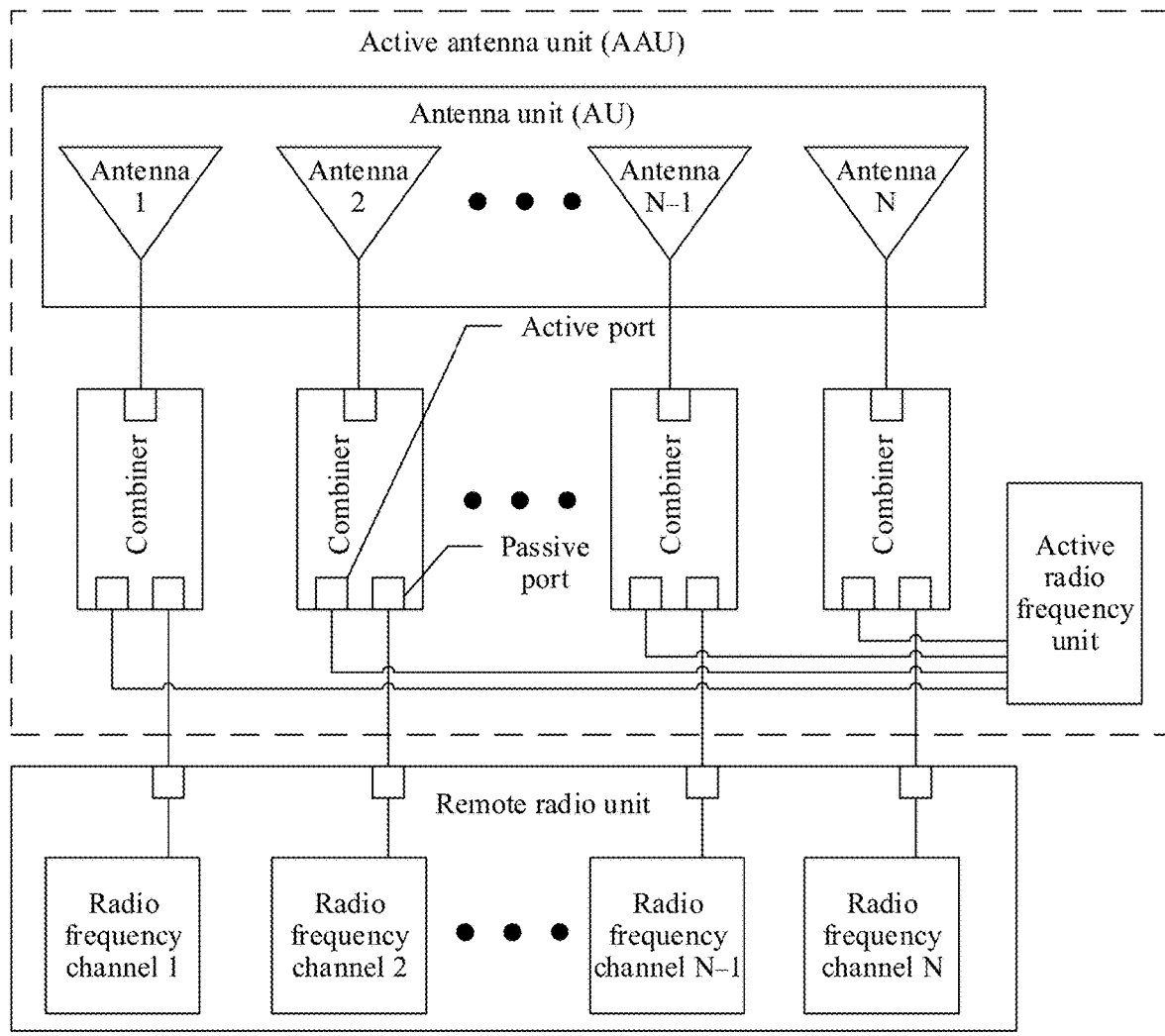
FIG. 2 is a schematic diagram of a connection between an active antenna unit and a passive radio frequency unit according to an embodiment of this application.
Figure 3:
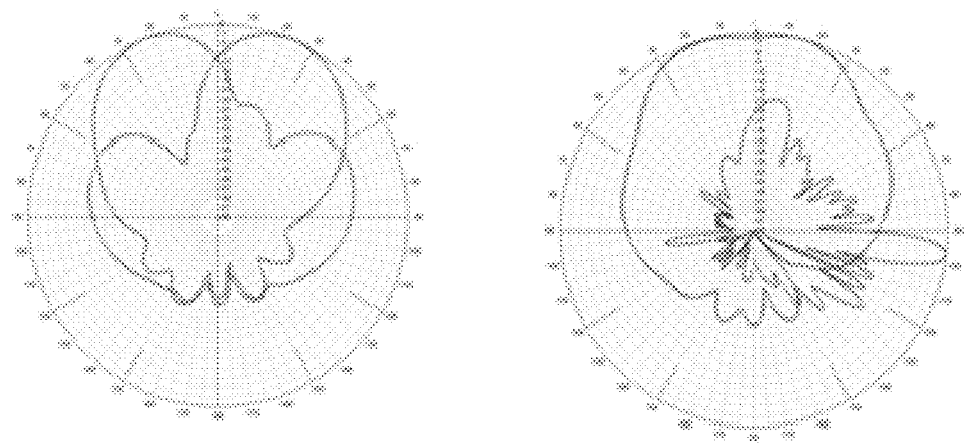
FIG. 3 is a schematic diagram of a change in a beam coverage range according to an embodiment of this application.
Figure 5:
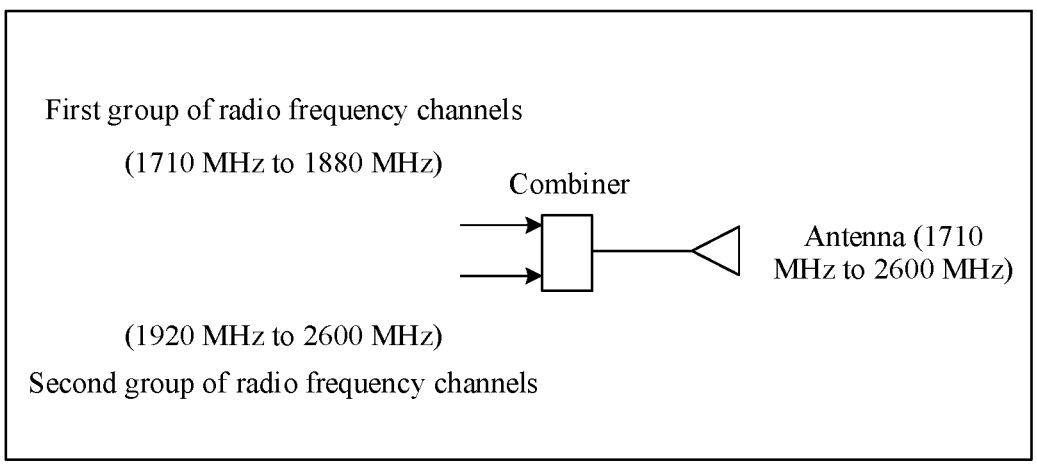
FIG. 5 is a schematic diagram in which signals in different frequency bands are separately processed by using different radio frequency channels according to an embodiment of this application.

It should be noted that different radio frequency units may process signals in different frequency bands. For example, as shown in FIG. 5, a combiner is connected to both a first group of radio frequency channels and a second group of radio frequency channels, where the first group of radio frequency channels and the second group of radio frequency channels may separately belong to different radio frequency units. A first radio frequency unit including the first group of radio frequency channels may process a signal in a frequency band of 1710 MHz to 1880 MHz, a second radio frequency unit including the second group of radio frequency channels may process a signal in a frequency band of 1920 MHz to 2600 MHz, and an antenna connected to the two radio frequency units may receive a signal in a frequency band of 1710 MHz to 2600 MHz. If the first group of radio frequency channels are reference radio frequency channels, and the second group of radio frequency channels are to-be-detected radio frequency channels, that is, a frequency band of a radio frequency signal that is processed by using the reference radio frequency channel is different from a frequency band of a radio frequency signal that is processed by using the to-be-detected radio frequency channel, when the detection solution provided in the embodiments of this application is used, the frequency bands processed by using the to-be-detected radio frequency channel and the reference radio frequency channel need to be configured to be the same. For example, the frequency band processed by using the second group of radio frequency channels (that is, the to-be-detected radio frequency channels) is set to be the same as the frequency band supported by the first group of radio frequency channels (that is, the reference radio frequency channels), that is, the frequency band of 1710 MHz to 1880 MHz. Specifically, the to-be-detected radio frequency unit may be a passive radio frequency unit, and the reference radio frequency unit may be a passive radio frequency unit or an active radio frequency unit. In application scenarios shown in FIG. 1 and FIG. 2, an active radio frequency unit may be used as the reference radio frequency unit, and an external radio frequency unit may be the to-be-detected radio frequency unit, where the external radio frequency unit may be a remote radio unit RRU.

It may be understood that alternatively, radio frequency channels between which a connection relationship needs to be detected may come from different to-be-detected radio frequency units, and the reference radio frequency channels may come from different radio frequency units. In this case, the detection method provided in the embodiments of this application may be used by exchanging information between different radio frequency units, or through control of at least one baseband unit connected to different radio frequency units. For brevity of description, in the embodiments of this application, an example in which all to-be-detected radio frequency channels belong to one to-be-detected radio frequency unit and all reference radio frequency channels belong to one reference radio frequency unit is used for description.

Figure 6:
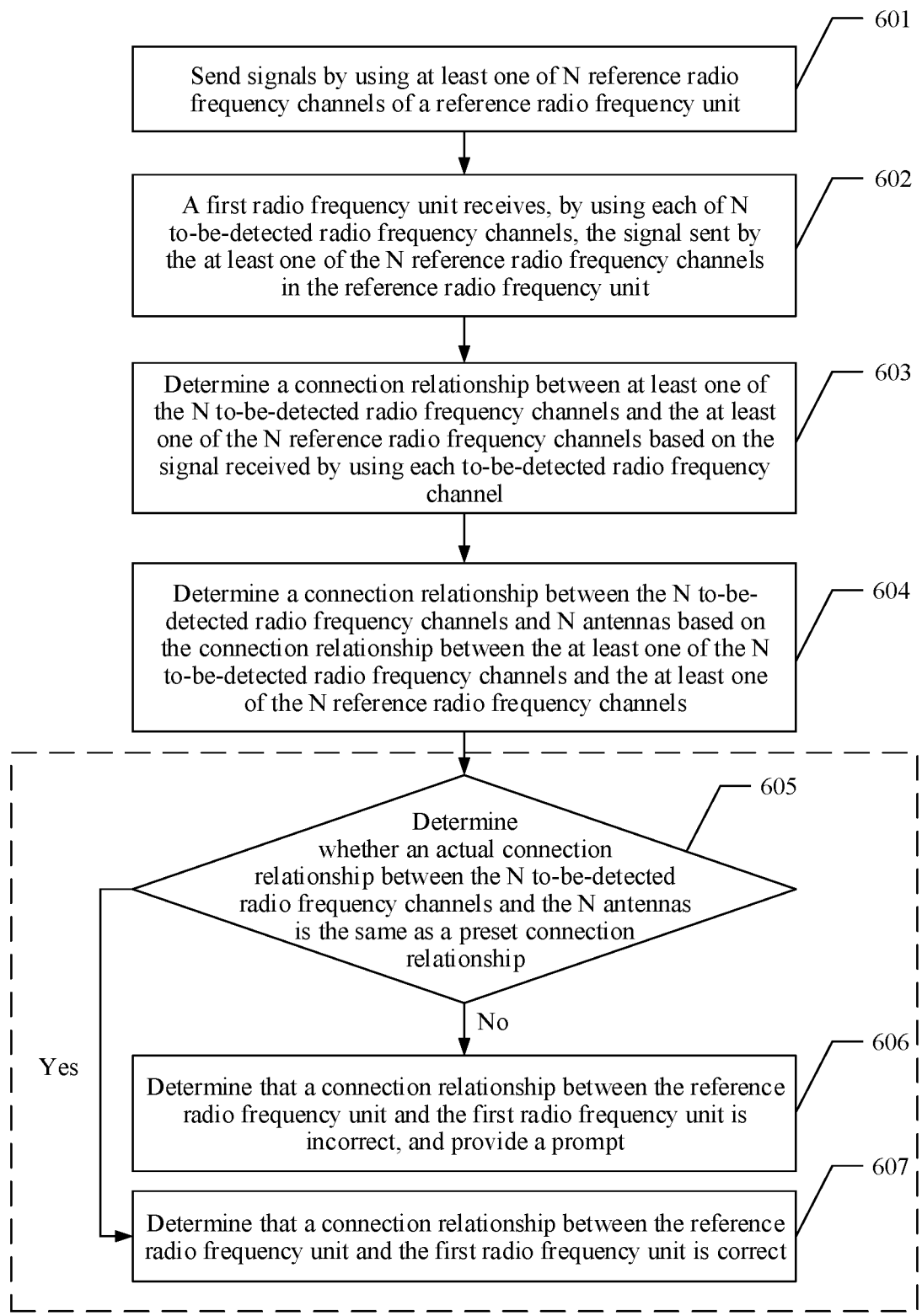
FIG. 6 is a schematic diagram of a radio frequency channel connection detection method according to an embodiment of this application.

For ease of understanding, the following describes a specific procedure in the embodiments of this application. Referring to FIG. 6, when measurement signals are sequentially sent by using reference radio frequency channels, a radio frequency channel connection detection apparatus includes a first radio frequency unit. An embodiment of the radio frequency channel connection detection method in the embodiments of this application includes the following steps.

601. Send signals by using at least one of N reference radio frequency channels of a reference radio frequency unit.

It should be noted that the signal in this embodiment and subsequent embodiments may be a dedicated measurement signal, or may be another existing signal, for example, a signal carrying service data or a reference signal. For ease of understanding, in this embodiment and the subsequent embodiments, an example in which the signal is a measurement signal is used for description. To distinguish measurement signals in different embodiments, in a scenario in which measurement signals are sequentially sent, the measurement signals are referred to as a first measurement signal; and in a scenario in which measurement signals are simultaneously sent, the measurement signals are referred to as a second measurement signal. This embodiment is applied to a scenario in which measurement signals are sequentially sent by using M reference radio frequency channels of the N reference radio frequency channels, where M is an integer greater than or equal to 1 and less than or equal to N. The signal in this embodiment is described by using the first measurement signal as an example.

Specifically, first measurement signals are sent by using the M reference radio frequency channels of the reference radio frequency unit, where the first measurement signals are used to determine a connection relationship between N to-be-detected radio frequency channels and N antennas. Specifically, the first measurement signals are sequentially sent by using the M reference radio frequency channels of the reference radio frequency unit according to a preset sending sequence, and the sent first measurement signals may be received by using each to-be-detected radio frequency channel of the first radio frequency unit. Optionally, M may be equal to N or N−1. To be specific, the connection relationship between the N to-be-detected radio frequency channels and the N antennas can be determined only after the signals are sent by using the N or N−1 reference radio frequency channels.

Each of the N reference radio frequency channels is connected to one to-be-detected radio frequency channel by using a combiner apparatus, and different reference radio frequency channels are connected to different or same to-be-detected radio frequency channels. When a reference radio frequency channel is used to send a signal, a to-be-detected radio frequency channel connected to the reference radio frequency channel may be used to loop, back to a receive channel of the to-be-detected radio frequency channel by using a standing wave channel and a radio frequency loopback technology, the signal sent by using the reference radio frequency channel, to receive the signal. In this case, a strength of the signal received by using the to-be-detected radio frequency channel is relatively strong. Because a radio frequency signal has a feature of spatial radiation and different radio frequency channels cannot be completely isolated, when a signal is sent on a reference radio frequency channel, the sent signal is also received on a to-be-detected radio frequency channel that is not connected to the reference radio frequency channel. To be specific, the sent signal is leaked to another to-be-detected radio frequency channel as an interference signal, and a strength of the signal received on the another to-be-detected radio frequency channel is very weak.

The first measurement signal is a general name of measurement signals sent on each reference radio frequency channel. In this embodiment, features of first measurement signals sent on the reference radio frequency channels may be the same or may be different. The first measurement signal is a set of a plurality of measurement signals that are sent in sequence, and is used to identify the second measurement signal in a scenario in which measurement signals are simultaneously sent by using the reference radio frequency channels. A same feature of the signals may be represented in a plurality of forms. For example, the first measurement signals may be a same orthogonal frequency division multiplexing (OFDM) symbol, or the first measurement signals are generated by using a same reference sequence, or the first measurement signals use a same signal scrambling manner. Different features of the signals may also be represented in a plurality of forms. For another example, the first measurement signals may be different orthogonal frequency division multiplexing (OFDM) symbols, or the first measurement signals are generated by using different reference sequences, or the first measurement signals use different signal scrambling manners. This is not specifically limited herein. In this embodiment and the subsequent embodiments, the first radio frequency unit is a passive radio frequency unit, and the reference radio frequency unit may be an active radio frequency unit or a passive radio frequency unit. For ease of description, in this embodiment and the subsequent embodiments, an example in which the reference radio frequency unit is an active radio frequency unit and the first radio frequency unit is a passive radio frequency unit is used for description. In this embodiment and the subsequent embodiments, an example in which the reference radio frequency unit is an active radio frequency unit of the active antenna unit AAU and the first radio frequency unit is a first radio remote unit RRU is used for description.

For example, in a process in which the active radio frequency unit of the AAU sequentially sends the first measurement signals according to a preset sending sequence, the preset sending sequence may be a default sequence set by a vendor, for example, the reference radio frequency channels are numbered from top to bottom and from left to right; or the preset sending sequence may be a test sequence set by staff during product installation, and sending channels are randomly numbered. For example, N=M=4. When there are four reference radio frequency channels, the four reference radio frequency channels are sequentially numbered 1 to 4 in a default sequence set by a vendor. In a detection process, the $1^{st}$ first measurement signal may be first sent by using the reference radio frequency channel 1. After the sending on the reference radio frequency channel 1 is complete, the $2^{nd}$ first measurement signal is sent by using the reference radio frequency channel 2. This process is repeated until first measurement signals are sent by using all of the four reference radio frequency channels. A time interval at which the first measurement signals are sent by using the channels may be set based on an actual condition. This is not specifically limited herein. A quantity of the reference radio frequency channels may alternatively be another value, for example, may be 6 or 8. This is not specifically limited herein.

It should be further noted that the N reference radio frequency channels may be all channels of the reference radio frequency unit, or some channels of the reference radio frequency unit. This is not specifically limited herein.

Optionally, the sequentially sending signals by using the M of the N reference radio frequency channels may be implemented in a cyclic determining manner. To be specific, each time one reference radio frequency channel is used to send a signal, it is determined whether sending of the first measurement signals is completed on all of the M reference radio frequency channels. If sending of the first measurement signals is completed, signal sending on the reference radio frequency channels is ended, and if sending of the first measurement signals is not completed, signal sending is continued on a next reference radio frequency channel.

Optionally, when a preset time threshold is met, it is determined whether sending of the first measurement signals is completed on all of the M reference radio frequency channels. If the sending of the first measurement signals is completed on all of the M reference radio frequency channels, step 602 is performed. If the sending of the first measurement signals is not completed on all of the M reference radio frequency channels, signal sending is continued on a next reference radio frequency channel.

It may be understood that, in a scenario in which the first measurement signals are sequentially sent by using the M of the N reference radio frequency channels, after sending of measurement signals is completed on N−1 of the N reference radio frequency channels, a connection relationship between the remaining unique reference radio frequency channel and a to-be-detected radio frequency channel may be determined. Therefore, measurement signals may not be sent by using the last reference radio frequency channel. In actual application, measurement signals may be or may not be sent by using the last reference radio frequency channel. This is not specifically limited herein.

602. The first radio frequency unit receives, by using each of the N to-be-detected radio frequency channels, the one or more signals sent by using the at least one of the N reference radio frequency channels of the reference radio frequency unit.

The first radio frequency unit receives, by using each of the N to-be-detected radio frequency channels, the first measurement signals sent by using the at least one of the N reference radio frequency channels of the reference radio frequency unit. A quantity of the N to-be-detected radio frequency channels of the first radio frequency unit is the same as the quantity of the N reference radio frequency channels. For example, when the quantity of to-be-detected radio frequency channels of the first radio frequency unit is 4, that is, N is 4, the quantity of the reference radio frequency channels is also 4, that is, N is also 4.

For example, because the first measurement signals are sequentially sent according to a preset sending sequence, the first measurement signals are also sequentially received by using the to-be-detected radio frequency channels. For example, when there are four reference radio frequency channels respectively numbered 1 to 4, there are also four to-be-detected radio frequency channels that are of the first radio remote unit and that are connected to a passive port, and the four to-be-detected radio frequency channels are also respectively numbered 1 to 4. Due to a feature such as spatial radiation of the first measurement signal, interference is generated between radio frequency channels. To be specific, in addition to the first measurement signal sent by using the reference radio frequency channel 1 connected to the to-be-detected radio frequency channel 1, the to-be-detected radio frequency channel 1 of the first radio remote unit is further used to receive a first measurement signal sent by using another reference radio frequency channel (an interference path). For example, when the reference radio frequency channel 1 is used to send the first measurement signal, if the to-be-detected radio frequency channel 1 is connected to the reference radio frequency channel 1, the signal may be looped back to the to-be-detected radio frequency channel 1 by using a standing wave channel, and to-be-detected radio frequency channels (the to-be-detected radio frequency channel 2, due to spatial radiation and the like, the sent first measurement signal (that is, an interference signal) is received on the to-be-detected radio frequency channel 3, and the to-be-detected radio frequency channel 4) that are not connected to the reference radio frequency channel 1. A feature of the interference signal is the same as that of the first measurement signal, and a strength of the interference signal is weaker than that of the first measurement signal received by using the to-be-detected radio frequency channel 1.

For example, the first radio frequency unit is a first radio remote unit, the reference radio frequency unit is an active radio frequency unit AU of the AAU, and N to-be-detected radio frequency channels of the first radio remote unit are used to sequentially receive the first measurement signals sent by using channels of the active radio frequency unit. Regardless of whether first measurement signals sent by using the reference radio frequency channel each time have a same feature, because the first measurement signals are sent in sequence, the first measurement signals received by using the N to-be-detected radio frequency channels at a same moment have a same feature, but have different signal strengths. A signal on a to-be-detected radio frequency channel connected to a reference radio frequency channel has the strongest strength, and a first measurement signal that is received by another to-be-detected radio frequency channel has a weak signal strength due to a feature such as spatial radiation of the signal, and therefore may be defined as an interference signal.

It may be understood that, in the first group of radio frequency channels and the second group of radio frequency channels shown in FIG. 5, when receive frequency bands of different channels are different, to implement the method in the embodiments of this application, in this embodiment and the subsequent embodiments, a receive frequency band of a to-be-detected radio frequency channel may be set to a frequency band in which a signal sent by a reference radio frequency channel can be received.

603. Determine a connection relationship between at least one of the N to-be-detected radio frequency channels and the at least one of the N reference radio frequency channels based on the signals received by using each to-be-detected radio frequency channel.

The first radio frequency unit determines the connection relationship between the at least one of the N to-be-detected radio frequency channels and the at least one of the N reference radio frequency channels based on the signals received by using each to-be-detected radio frequency channel.

Specifically, when the first radio remote unit includes four to-be-detected radio frequency channels, after the first measurement signals are received by using the four to-be-detected radio frequency channels of the first radio remote unit each time, the first radio remote unit determines, based on signal strengths of the first measurement signals received by using the four to-be-detected radio frequency channels, that a to-be-detected radio frequency channel on which a received signal has the strongest strength is a to-be-detected radio frequency channel connected to a reference radio frequency channel on which the first measurement signal is sent each time.

It should be noted that in this embodiment, only one reference radio frequency channel is used to send the first measurement signals each time. Therefore, one connection relationship between a reference radio frequency channel and a to-be-detected radio frequency channel may be determined each time.

For example, there are four reference radio frequency channels and four to-be-detected radio frequency channels. Without loss of generality, a connection relationship when a to-be-detected radio frequency channel i and a reference radio frequency channel i is correct, where i=1, 2, 3, or 4. When the reference radio frequency channel 1 is used to send the first measurement signal, the reference radio frequency channel 1 is a target reference radio frequency channel, the first measurement signal sent by using the reference radio frequency channel 1 is a target measurement signal. The target measurement signal or an interference signal of the target measurement signal is received by using the four to-be-detected radio frequency channels of the first radio remote unit. Signal strengths on the to-be-detected radio frequency channel 1 to the to-be-detected radio frequency channel 4 are compared. If the signal strength on the to-be-detected radio frequency channel 1 is the strongest, a signal received by using the to-be-detected radio frequency channel 1 is determined as a target measurement signal, signals received by using the to-be-detected radio frequency channel 2 to the to-be-detected radio frequency channel 4 are determined as interference signals, and the to-be-detected radio frequency channel 1 that is used to receive the target measurement signal is determined as a target to-be-detected radio frequency channel. The target to-be-detected radio frequency channel corresponds to the target reference radio frequency channel, that is, the to-be-detected radio frequency channel 1 is correspondingly connected to the reference radio frequency channel 1, as shown in FIG. 7. For another example, when the reference radio frequency channel 1 is used to send the first measurement signal, the reference radio frequency channel 1 is a target reference radio frequency channel, the first measurement signal sent by using the reference radio frequency channel 1 is a target measurement signal, and four receive channels of the first radio remote unit are used to receive the target measurement signal or an interference signal of the target measurement signal. Signal strengths on the to-be-detected radio frequency channel 1 to the to-be-detected radio frequency channel 4 are compared. If a signal strength on the to-be-detected radio frequency channel 2 is the strongest, a signal received by using the to-be-detected radio frequency channel 2 is determined as a target measurement signal, signals received by using the to-be-detected radio frequency channel 1, the to-be-detected radio frequency channel 3, and the to-be-detected radio frequency channel 4 are determined as interference signals, and the to-be-detected radio frequency channel 2 that is used to receive the target measurement signal is determined as a target to-be-detected radio frequency channel. The target to-be-detected radio frequency channel corresponds to the target reference radio frequency channel, that is, the to-be-detected radio frequency channel 2 is correspondingly connected to the reference radio frequency channel 1, as shown in FIG. 8.

604. Determine the connection relationship between the N to-be-detected radio frequency channels and the N antennas based on the connection relationship between the at least one of the N to-be-detected radio frequency channels and the at least one of the N reference radio frequency channels.

The first radio frequency unit determines the connection relationship between the N to-be-detected radio frequency channels and the N antennas based on the connection relationship between the at least one of the N to-be-detected radio frequency channels and the at least one of the N reference radio frequency channels.

Specifically, the first radio frequency unit determines a connection relationship between one of the N to-be-detected radio frequency channels and a target reference radio frequency channel based on a signal strength of a first measurement signal that is sent by one reference radio frequency channel and that is received by using each to-be-detected radio frequency channel, where the reference radio frequency channel is the target reference radio frequency channel. A to-be-detected radio frequency channel on which a received first measurement signal has the strongest signal strength is connected to the target reference radio frequency channel, and the to-be-detected radio frequency channel is connected to an antenna that is connected to the target reference radio frequency channel.

For example, there are four reference radio frequency channels and four to-be-detected radio frequency channels. When the first radio remote unit includes four to-be-detected radio frequency channels, the four reference radio frequency channels separately send first measurement signals in sequence, and the first measurement signals are sent four times in total. A connection relationship between the four to-be-detected radio frequency channels and the four reference radio frequency channels is determined based on a connection relationship that is determined each time and that is between one to-be-detected radio frequency channel and one reference radio frequency channel. Because one to-be-detected radio frequency channel is connected to one reference radio frequency channel, and one reference radio frequency channel is connected to one antenna, the connection relationship between the four to-be-detected radio frequency channels and four antennas may be determined.

In a feasible implementation, the N to-be-detected radio frequency channels are connected to a baseband unit (BBU) and the action of specifically determining the connection relationship between the N to-be-detected radio frequency channels and the N antennas may be performed by the BBU. For example, step 603 and step 604 may alternatively be performed by the baseband unit BBU, or may still be performed by the first radio frequency unit.

It may be understood that, when the specific determining action is performed by the BBU, between step 602 and step 603, a step of sending, by the first radio frequency unit, the received first measurement signals to the BBU is further included:

Optionally: 605. Determine whether an actual connection relationship between the N to-be-detected radio frequency channels and the N antennas is the same as a preset connection relationship.

The first radio frequency unit or the BBU connected to the first radio frequency unit determines whether the actual connection relationship between the N to-be-detected radio frequency channels and the N antennas is the same as the preset connection relationship. Specifically, the first radio frequency unit or the BBU connected to the first radio frequency unit compares an actual connection relationship between the to-be-detected radio frequency channels and the reference radio frequency channels corresponding to the to-be-detected radio frequency channels with the preset connection relationship (that is, a preset correct correspondence between the to-be-detected radio frequency channels and the reference radio frequency channels). If the actual connection relationship is different from the preset connection relationship, step 606 is performed. If the actual connection relationship is the same as the preset connection relationship, step 607 is performed.

Optionally: 606. Determine that a connection relationship between the reference radio frequency unit and the first radio frequency unit is incorrect, and provide a prompt.

The first radio frequency unit or the BBU connected to the first radio frequency unit determines that the connection relationship between the reference radio frequency unit and the first radio frequency unit is incorrect, and provides a prompt.

Optionally: 607. Determine that a connection relationship between the reference radio frequency unit and the first radio frequency unit is correct.

The first radio frequency unit or the BBU connected to the first radio frequency unit determines that the connection relationship between the reference radio frequency unit and the first radio frequency unit is correct.

In this embodiment of this application, when the reference radio frequency unit is connected to the first radio frequency unit, the reference radio frequency unit sequentially sends the first measurement signals according to the preset sending sequence, and in the process in which the first radio frequency unit receives the first measurement signals, whether a cable connection relationship between the first radio frequency unit and the active AU is correct is detected, to assist the staff in adjustment. This reduces difficulty in secondary onsite construction and improves the construction efficiency.

Figure 9:
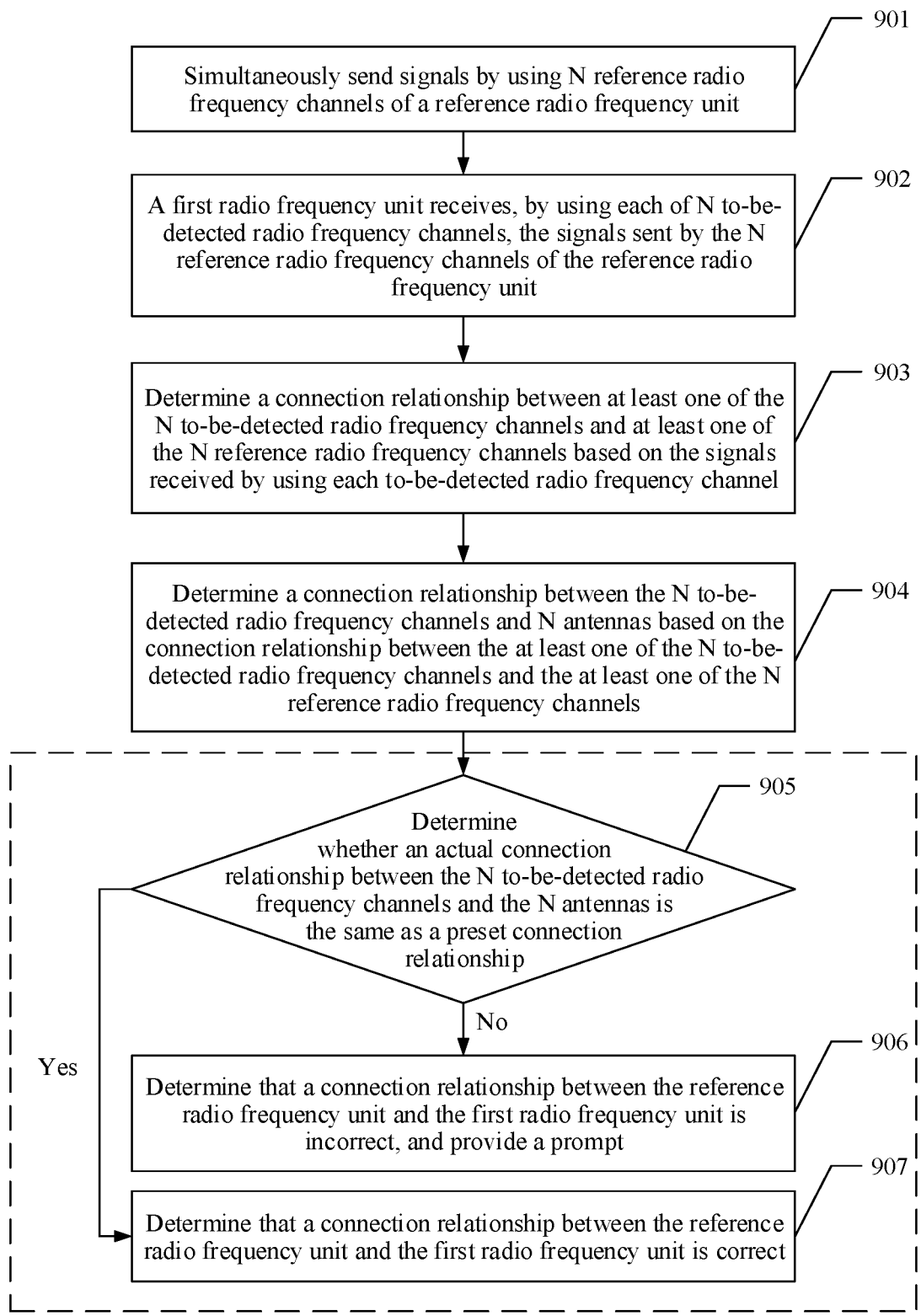
FIG. 9 is a schematic diagram of another radio frequency channel connection detection method according to an embodiment of this application.

Referring to FIG. 9, another radio frequency channel connection detection method according to an embodiment of this application includes the following steps.

901. Simultaneously send signals by using N reference radio frequency channels of a reference radio frequency unit.

This embodiment is described by using an example in which the signal is a measurement signal. This embodiment is applied to a scenario in which measurement signals are simultaneously sent by using N reference radio frequency channels. In this embodiment, a second measurement signal is used as an example for description.

Specifically, the N reference radio frequency channels of the reference radio frequency unit are used to simultaneously send second measurement signals, and the second measurement signals are used to determine a connection relationship between N to-be-detected radio frequency channels and N antennas. Specifically, the N reference radio frequency channels of the reference radio frequency unit are used to simultaneously send the second measurement signals, and the sent second measurement signals may be received by using each to-be-detected radio frequency channel of a first radio remote unit.

Each of the N reference radio frequency channels is connected to one to-be-detected radio frequency channel by using a combiner apparatus, and different reference radio frequency channels are connected to different or same to-be-detected radio frequency channels. When a reference radio frequency channel is used to send a signal, a to-be-detected radio frequency channel connected to the reference radio frequency channel may be used to loop, back to a receive channel of the to-be-detected radio frequency channel by using a standing wave channel and a radio frequency loopback technology, the signal sent by using the reference radio frequency channel, to receive the signal. In this case, a strength of the signal received by using the to-be-detected radio frequency channel is relatively strong. Because a radio frequency signal has a feature of spatial radiation and different radio frequency channels cannot be completely isolated, when a signal is sent on a reference radio frequency channel, the sent signal is also received on a to-be-detected radio frequency channel that is not connected to the reference radio frequency channel. To be specific, the sent signal is leaked to another to-be-detected radio frequency channel as an interference signal, and a strength of the signal received on the another to-be-detected radio frequency channel is very weak.

The second measurement signal is a general name of measurement signals sent on each reference radio frequency channel. In this embodiment, features of second measurement signals sent on the reference radio frequency channels are different. The second measurement signal is a set of a plurality of measurement signals that are simultaneously sent, and is used to identify a first measurement signal in a scenario in which measurement signals are sequentially sent by using the reference radio frequency channels. Different features may be represented in a plurality of forms. For example, the second measurement signals may be different OFDM symbols, or the second measurement signals are generated by using different reference sequences, or the second measurement signals use different signal scrambling manners. This is not specifically limited herein.

For example, in a process in which an active radio frequency unit of an AAU simultaneously sends the second measurement signals, the reference radio frequency channels are numbered from top to bottom and from left to right; or a test sequence set by staff during product installation is used, and the reference radio frequency channels are randomly numbered. For example, N=4. When there are four reference radio frequency channels, the four reference radio frequency channels are sequentially numbered 1 to 4 in a default sequence set by a vendor. In a detection process, the second measurement signals are simultaneously sent by using the reference radio frequency channel 1 to the reference radio frequency channel 4. A quantity of the reference radio frequency channels may alternatively be another value, for example, may be 6, 8, or 10. This is not specifically limited herein.

It should be further noted that the N reference radio frequency channels may be all channels of the reference radio frequency unit, or some channels of the reference radio frequency unit. This is not specifically limited herein.

Optionally, "simultaneous sending" known in this application may be that sending is completed on all of a plurality of radio frequency channels within a specific time period. It is not strictly required that sending starts or ends at a same moment. Optionally, when a preset time threshold is met, it is determined whether sending of the second measurement signals is completed on all of the N reference radio frequency channels. If the sending of the second measurement signals is completed on all of the N reference radio frequency channels, step 902 is performed. If the sending of the second measurement signals is not completed on all of the N reference radio frequency channels, a next second measurement signal is simultaneously sent by using each reference radio frequency channel.

902. The first radio frequency unit receives, by using each of the N to-be-detected radio frequency channels, the signals sent by using the N reference radio frequency channels of the reference radio frequency unit.

The first radio frequency unit receives, by using each of the N to-be-detected radio frequency channels, the second measurement signals sent by using the N reference radio frequency channels of the reference radio frequency unit. A quantity of the N to-be-detected radio frequency channels of the first radio frequency unit is the same as a quantity of the N reference radio frequency channels. For example, when the quantity of to-be-detected radio frequency channels of the first radio frequency unit is 4, that is, N is 4, the quantity of the reference radio frequency channels is also 4, that is, N is also 4.

For example, all to-be-detected radio frequency channels of the first radio remote unit are used to receive the second measurement signals sent by using the N reference radio frequency channels. Because the second measurement signals are simultaneously sent, one second measurement signal with a strong signal strength and several second measurement signals with weak signal strengths are simultaneously received on each to-be-detected radio frequency channel, and distinguishes, based on different signal features, second measurement signals sent by using different reference radio frequency channels. For example, when there are four reference radio frequency channels, the four reference radio frequency channels respectively numbered 1 to 4, there are also four to-be-detected radio frequency channels that are of the first radio remote unit and that are connected to a passive port, and the four to-be-detected radio frequency channels are also respectively numbered 1 to 4. Because features of second measurement signals sent by all reference radio frequency channels are different, a second measurement signal sent by using the reference radio frequency channel 1 is referred to as a feature signal 1. Similarly, a second measurement signal sent by using the reference radio frequency channel 2 is referred to as a feature signal 2, a second measurement signal sent by using the reference radio frequency channel 3 is referred to as a feature signal 3, and a second measurement signal sent by using the reference radio frequency channel 4 is referred to as a feature signal 4. Due to a feature such as spatial radiation of the second measurement signal, interference is generated between radio frequency channels. To be specific, in addition to receiving the feature signal 1 sent by using the reference radio frequency channel 1 that is connected to the to-be-detected radio frequency channel 1, the to-be-detected radio frequency channel 1 of the first radio remote unit is further used to receive other feature signals (the feature signal 2, the feature signal 3, and the feature signal 4) sent by using the other reference radio frequency channels. For example, for the feature signal 1 sent by using the reference radio frequency channel 1, if the to-be-detected radio frequency channel 1 is connected to the reference radio frequency channel 1, the to-be-detected radio frequency channel 1 receives the feature signal 1 and another feature signal, and a signal strength of the another feature signal is weaker than a signal strength of the feature signal 1. For another example, for the feature signal 1 sent by using the reference radio frequency channel 1, if the to-be-detected radio frequency channel 2 is connected to the reference radio frequency channel 1, the to-be-detected radio frequency channel 2 is used to receive the feature signal 1 and another feature signal, and a signal strength of the another feature signal is weaker than a signal strength of the feature signal 1.

For example, the first radio frequency unit is a first radio remote unit, the reference radio frequency unit is an active radio frequency unit RU of the AAU, and N to-be-detected radio frequency channels of the first radio remote unit are used to simultaneously receive second measurement signals sent by using the N reference radio frequency channels of the active radio frequency unit. Features of the second measurement signals that are simultaneously sent by using the N reference radio frequency channels are different. Any one of the N to-be-detected radio frequency channels, that is, a target to-be-detected radio frequency channel, is used to receive a plurality of second measurement signals with different features, and strengths of the second measurement signals are not completely the same. A received signal with the strongest signal strength is determined as a target feature signal corresponding to the to-be-detected radio frequency channel, and a reference radio frequency channel sending the target feature signal is determined as a reference radio frequency channel connected to the target to-be-detected radio frequency channel.

903. Determine a connection relationship between at least one of the N to-be-detected radio frequency channels and at least one of the N reference radio frequency channels based on the signals received by using each to-be-detected radio frequency channel.

The first radio frequency unit determines the connection relationship between the at least one of the N to-be-detected radio frequency channels and the at least one of the N reference radio frequency channels based on the second measurement signals received by using each to-be-detected radio frequency channel.

Specifically, when the first radio remote unit includes four to-be-detected radio frequency channels, after the second measurement signals are received by using the four to-be-detected radio frequency channels of the first radio remote unit, the first radio remote unit determines, based on signal strengths of the second measurement signals received by using the four to-be-detected radio frequency channels, that a to-be-detected radio frequency channel on which a received signal has the strongest strength is connected to a reference radio frequency channel on which a measurement signal having the strongest signal strength is sent.

For example, there are four reference radio frequency channels and four to-be-detected radio frequency channels. When there are four reference radio frequency channels respectively numbered 1 to 4, there are also four to-be-detected radio frequency channels that are of the first radio remote unit and that are connected to a passive port, and the four to-be-detected radio frequency channels are also respectively numbered 1 to 4. Because features of second measurement signals sent by all reference radio frequency channels are different, a second measurement signal sent by using the reference radio frequency channel 1 is referred to as a feature signal 1. Similarly, a second measurement signal sent by using the reference radio frequency channel 2 is referred to as a feature signal 2, a second measurement signal sent by using the reference radio frequency channel 3 is referred to as a feature signal 3, and a second measurement signal sent by using the reference radio frequency channel 4 is referred to as a feature signal 4. Due to a feature such as spatial radiation of the second measurement signal, interference is generated between radio frequency channels. To be specific, in addition to receiving the feature signal 1 sent by using the reference radio frequency channel 1 that is connected to the to-be-detected radio frequency channel 1, the to-be-detected radio frequency channel 1 of the first radio remote unit is further used to receive other feature signals (the feature signal 2, the feature signal 3, and the feature signal 4) sent by using the other reference radio frequency channels (interference paths). For example, for the feature signal 1 sent by using the reference radio frequency channel 1, if the to-be-detected radio frequency channel 1 is connected to the reference radio frequency channel 1, the to-be-detected radio frequency channel 2 is connected to the reference radio frequency channel 2, the to-be-detected radio frequency channel 3 is connected to the reference radio frequency channel 3, and the to-be-detected radio frequency channel 4 is connected to the reference radio frequency channel 4, the to-be-detected radio frequency channel 1 is used to receive the feature signal 1 with the strongest signal strength and other feature signals (interference signals), the to-be-detected radio frequency channel 2 is used to receive the feature signal 2 with the strongest signal strength and other feature signals (interference signals), the to-be-detected radio frequency channel 3 is used to receive the feature signal 3 with the strongest signal strength and other feature signals (interference signals), the to-be-detected radio frequency channel 4 is used to receive the feature signal 4 with the strongest signal strength and other feature signals (interference signals), and a signal strength of the interference signal received on the to-be-detected radio frequency channel 1 is weaker than a signal strength of the feature signal 1 received on the to-be-detected radio frequency channel 1, as shown in FIG. 10. For another example, for the feature signal 1 sent by using the reference radio frequency channel 1, the to-be-detected radio frequency channel 2 is connected to the reference radio frequency channel 1, the to-be-detected radio frequency channel 1 is connected to the reference radio frequency channel 2, the to-be-detected radio frequency channel 3 is connected to the reference radio frequency channel 3, and the to-be-detected radio frequency channel 4 is connected to the reference radio frequency channel 4. In this case, the to-be-detected radio frequency channel 2 receives the feature signal 1 with the strongest signal strength and other feature signals (interference signals), the to-be-detected radio frequency channel 1 receives the feature signal 2 with the strongest signal strength and other feature signals (interference signals), the to-be-detected radio frequency channel 3 receives the feature signal 3 with the strongest signal strength and other feature signals (interference signals), the to-be-detected radio frequency channel 4 receives the feature signal 4 with the strongest signal strength and other feature signals (interference signals), and a signal strength of the interference signal received on the to-be-detected radio frequency channel 2 is weaker than a signal strength of the feature signal 1 on the to-be-detected radio frequency channel 2, as shown in FIG. 11.

It should be noted that, in addition to receiving the feature signal 1 shown in FIG. 10, the to-be-detected radio frequency channel 1 is further used to receive other feature signals (the feature signal 2, the feature signal 3, and the feature signal 4). A specific process is not described herein again.

904. Determine the connection relationship between the N to-be-detected radio frequency channels and the N antennas based on the connection relationship between the at least one of the N to-be-detected radio frequency channels and the at least one of the N reference radio frequency channels.

The first radio frequency unit determines the connection relationship between the N to-be-detected radio frequency channels and the N antennas based on the connection relationship between the at least one of the N to-be-detected radio frequency channels and the at least one of the N reference radio frequency channels.

For example, there are four reference radio frequency channels and four to-be-detected radio frequency channels. A second measurement signal that is sent by a reference radio frequency channel connected to each to-be-detected radio frequency channel of the first radio frequency unit and that is received by using the to-be-detected radio frequency channel and a plurality of second measurement signals that are sent by using other reference radio frequency channels not connected to the to-be-detected radio frequency channel of the first radio frequency unit and that are received by using the to-be-detected radio frequency channel specifically including one feature signal and other feature signals (interference signals), for example, the feature signal 1 and other feature signals (the feature signal 2, the feature signal 3, and the feature signal 4). A signal strength of the feature signal 1 is the strongest, and the reference radio frequency channel 1 used to send the feature signal 1 is a target reference radio frequency channel. A connection relationship between one of the four to-be-detected radio frequency channels and the target reference radio frequency channel is determined. For example, the reference radio frequency channel 1 is used to send the feature signal 1, and if a signal strength of the feature signal 1 in second measurement signals received by using the to-be-detected radio frequency channel 1 is the strongest, the to-be-detected radio frequency channel 1 is determined as a to-be-detected radio frequency channel connected to the reference radio frequency channel 1. The to-be-detected radio frequency channel 1 is connected to an antenna that is connected to the reference radio frequency channel 1.

For example, there are four reference radio frequency channels and four to-be-detected radio frequency channels. When the first radio remote unit includes four to-be-detected radio frequency channels, the four reference radio frequency channels are used to simultaneously send the second measurement signals, and the second measurement signals are sent once in total. A connection relationship between the four to-be-detected radio frequency channels and the four reference radio frequency channels is determined based on a determined connection relationship between a to-be-detected radio frequency channel and a reference radio frequency channel. Because one to-be-detected radio frequency channel is connected to one reference radio frequency channel, and one reference radio frequency channel is connected to one antenna, the connection relationship between the four to-be-detected radio frequency channels and four antennas may be determined.

In a feasible implementation, the N to-be-detected radio frequency channels are connected to a baseband unit (BBU), and the action of specifically determining the connection relationship between the N to-be-detected radio frequency channels and the N antennas is performed by the BBU. For example, step 903 and step 904 may be implemented on the first radio frequency unit, or may be implemented on the BBU.

It may be understood that, when the specific determining action is performed by the BBU, between step 902 and step 903, a step of sending, by the first radio frequency unit, the received second measurement signals to the BBU is further included. This is not specifically limited herein.

Optionally: 905. Determine whether an actual connection relationship between the N to-be-detected radio frequency channels and the N antennas is the same as a preset connection relationship.

The first radio frequency unit or the BBU connected to the first radio frequency unit determines whether the actual connection relationship between the N to-be-detected radio frequency channels and the N antennas is the same as the preset connection relationship. Specifically, the first radio frequency unit or the BBU connected to the first radio frequency unit compares an actual connection relationship between the to-be-detected radio frequency channels and the reference radio frequency channels corresponding to the to-be-detected radio frequency channels with the preset connection relationship (that is, a preset correct correspondence between the to-be-detected radio frequency channels and the reference radio frequency channels). If the actual connection relationship is different from the preset connection relationship, step 906 is performed. If the actual connection relationship is the same as the preset connection relationship, step 907 is performed.

Optionally: 906. Determine that a connection relationship between the reference radio frequency unit and the first radio frequency unit is incorrect, and provide a prompt.

The first radio frequency unit or the BBU connected to the first radio frequency unit determines that the connection relationship between the reference radio frequency unit and the first radio frequency unit is incorrect, and provides a prompt.

Optionally: 907. Determine that a connection relationship between the reference radio frequency unit and the first radio frequency unit is correct.

The first radio frequency unit or the BBU connected to the first radio frequency unit determines that the connection relationship between the reference radio frequency unit and the first radio frequency unit is correct.

In this embodiment of this application, when the reference radio frequency unit is connected to the first radio frequency unit, the reference radio frequency unit simultaneously sends the second measurement signals, and in the process in which the first radio frequency unit receives the second measurement signals, whether a cable connection relationship between the first radio frequency unit and the antennas AU of the reference radio frequency unit is correct is detected, to assist the staff in adjustment. This reduces difficulty in secondary onsite construction and improves the construction efficiency.

Figure 12:
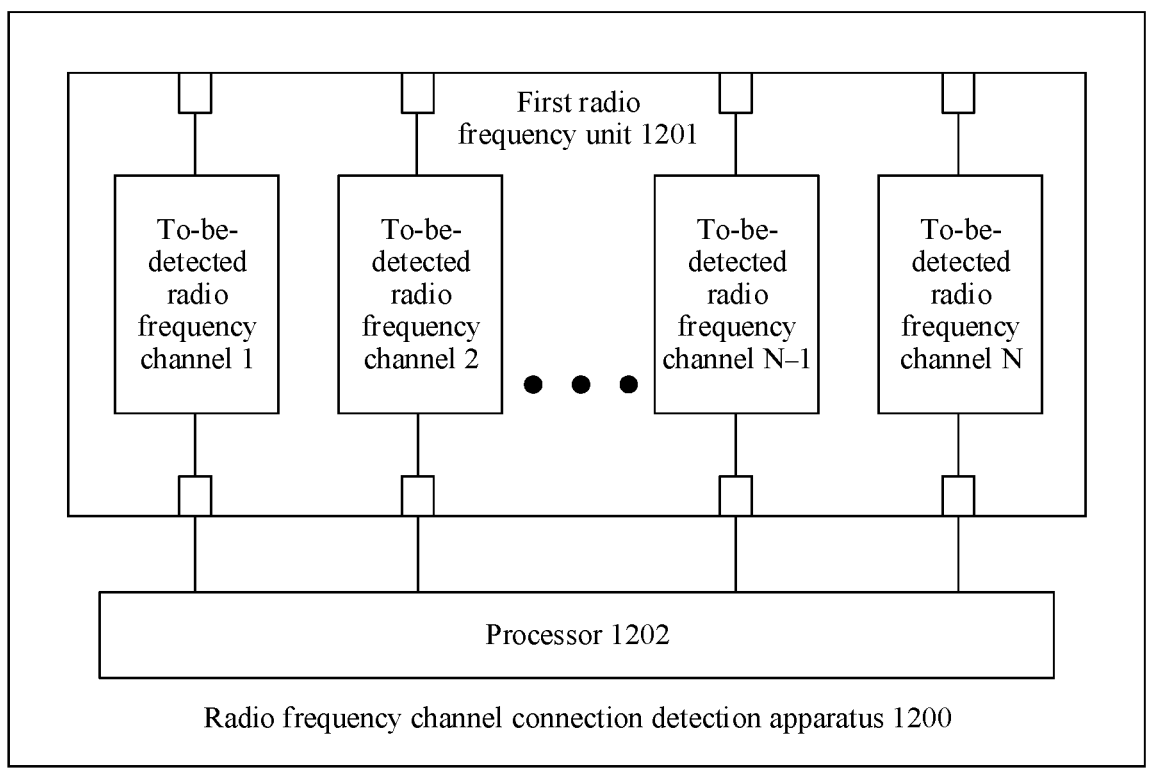
FIG. 12 is a schematic diagram of a radio frequency channel connection detection apparatus according to an embodiment of this application.

The foregoing describes the radio frequency channel connection detection method in the embodiments of this application. The following describes a radio frequency channel connection detection apparatus in the embodiments of this application. FIG. 12 shows a radio frequency channel connection detection apparatus in the embodiment of this application.

FIG. 12 is a schematic structural block diagram of a radio frequency channel connection detection apparatus according to an embodiment of this application. Referring to FIG. 12, the radio frequency channel connection detection apparatus includes a first radio frequency unit and a processor. When an integrated unit is used, FIG. 12 is a possible schematic structural diagram of the radio frequency channel connection detection apparatus in the foregoing embodiments. Persons skilled in the art may understand that, a structure of the first radio frequency unit shown in FIG. 12 does not constitute a limitation on the first radio frequency unit, and the first radio frequency unit may include more or fewer components than those shown in the figure, or combine some components, or have different component arrangements.

Referring to FIG. 12, a radio frequency channel connection detection apparatus 1200 includes a first radio frequency unit 1201 and a processor 1202, and the first radio frequency unit 1201 includes N to-be-detected radio frequency channels. Any one of the N to-be-detected radio frequency channels and one of N reference radio frequency channels are connected to one of N antennas by using a combiner apparatus. The to-be-detected radio frequency channels are connected to different reference radio frequency channels and different antennas, and N is an integer greater than or equal to 2.

Each of the N to-be-detected radio frequency channels is configured to receive signals sent by using at least one of the N reference radio frequency channels.

The radio frequency channel connection detection apparatus further includes the processor 1202. The processor 1202 is connected to the N to-be-detected radio frequency channels, and is configured to determine a connection relationship between the N to-be-detected radio frequency channels and the N antennas based on the signals received by using each to-be-detected radio frequency channel.

It should be noted that, in this embodiment, the combiner apparatus may be a combiner, the first radio frequency unit may be a radio remote unit, and the processor 1202 may be disposed in the radio remote unit RRU, or may be disposed outside the RRU and independently exist.

Figure 13:
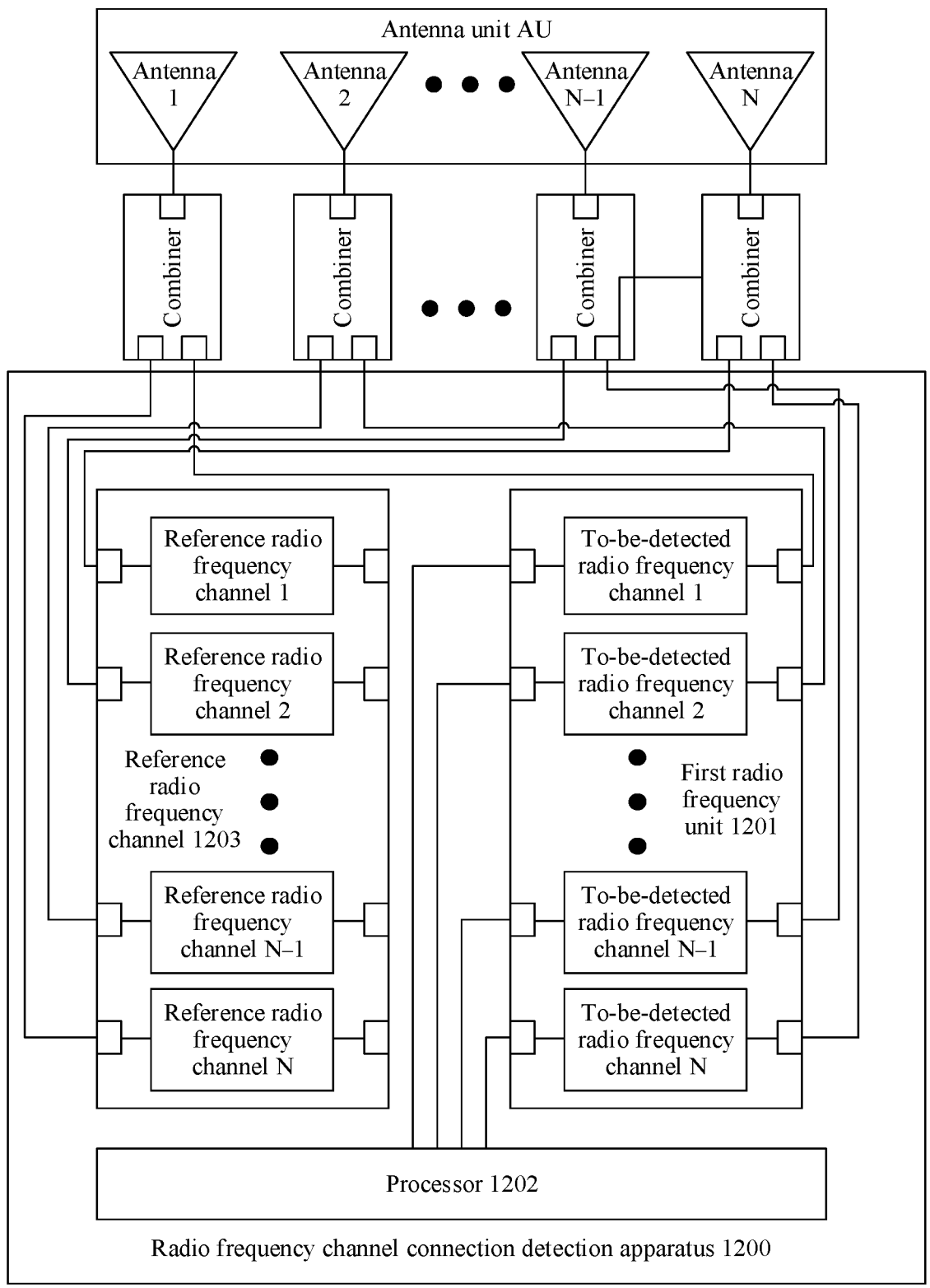
FIG. 13 is a schematic diagram of another radio frequency channel connection detection apparatus according to an embodiment of this application.

The following describes each component of the radio frequency channel connection detection apparatus in detail with reference to FIG. 13.

In a feasible implementation, the processor 1202 is further configured to:

determine a connection relationship between at least one of the N to-be-detected radio frequency channels and at least one of the N reference radio frequency channels based on the signals received by using each to-be-detected radio frequency channel; and determine the connection relationship between the N to-be-detected radio frequency channels and the N antennas based on the connection relationship between the at least one of the N to-be-detected radio frequency channels and the at least one of the N reference radio frequency channels.

In a feasible implementation, the N reference radio frequency channels are configured to sequentially send signals.

Each of the N to-be-detected radio frequency channels is further configured to sequentially receive signals sent by using the N reference radio frequency channels.

In a feasible implementation, the processor 1202 is specifically configured to:

determine a connection relationship between one of the N to-be-detected radio frequency channels and one of the N reference radio frequency channels based on a signal strength of a signal that is sent by using the reference radio frequency channel and that is received by using each to-be-detected radio frequency channel, where a to-be-detected radio frequency channel on which a received signal has the strongest signal strength is connected to the reference radio frequency channel, and the to-be-detected radio frequency channel is connected to an antenna that is connected to the reference radio frequency channel.

In a feasible implementation, referring to FIG. 13, the radio frequency channel connection detection apparatus 1200 further includes a reference radio frequency unit 1203, and the reference radio frequency unit 1203 includes N reference radio frequency channels.

The N reference radio frequency channels are configured to simultaneously send signals, and a feature of a signal sent by using any one of the N reference radio frequency channels is different from a feature of a signal sent by using another one of the N reference radio frequency channels.

Each of the N to-be-detected radio frequency channels is used to receive the signals simultaneously sent by using the N reference radio frequency channels.

In a feasible implementation, the processor 1202 is specifically configured to:

determine a connection relationship between one of the N to-be-detected radio frequency channels and one of the N reference radio frequency channels based on signal strengths of signals that are in the signals received by using each to-be-detected radio frequency channel and that have a same feature, where a to-be-detected radio frequency channel by using which a signal having the strongest signal strength in the signals having the same feature is received is connected to the reference radio frequency channel, and the to-be-detected radio frequency channel is connected to an antenna that is connected to the reference radio frequency channel.

Figure 14:
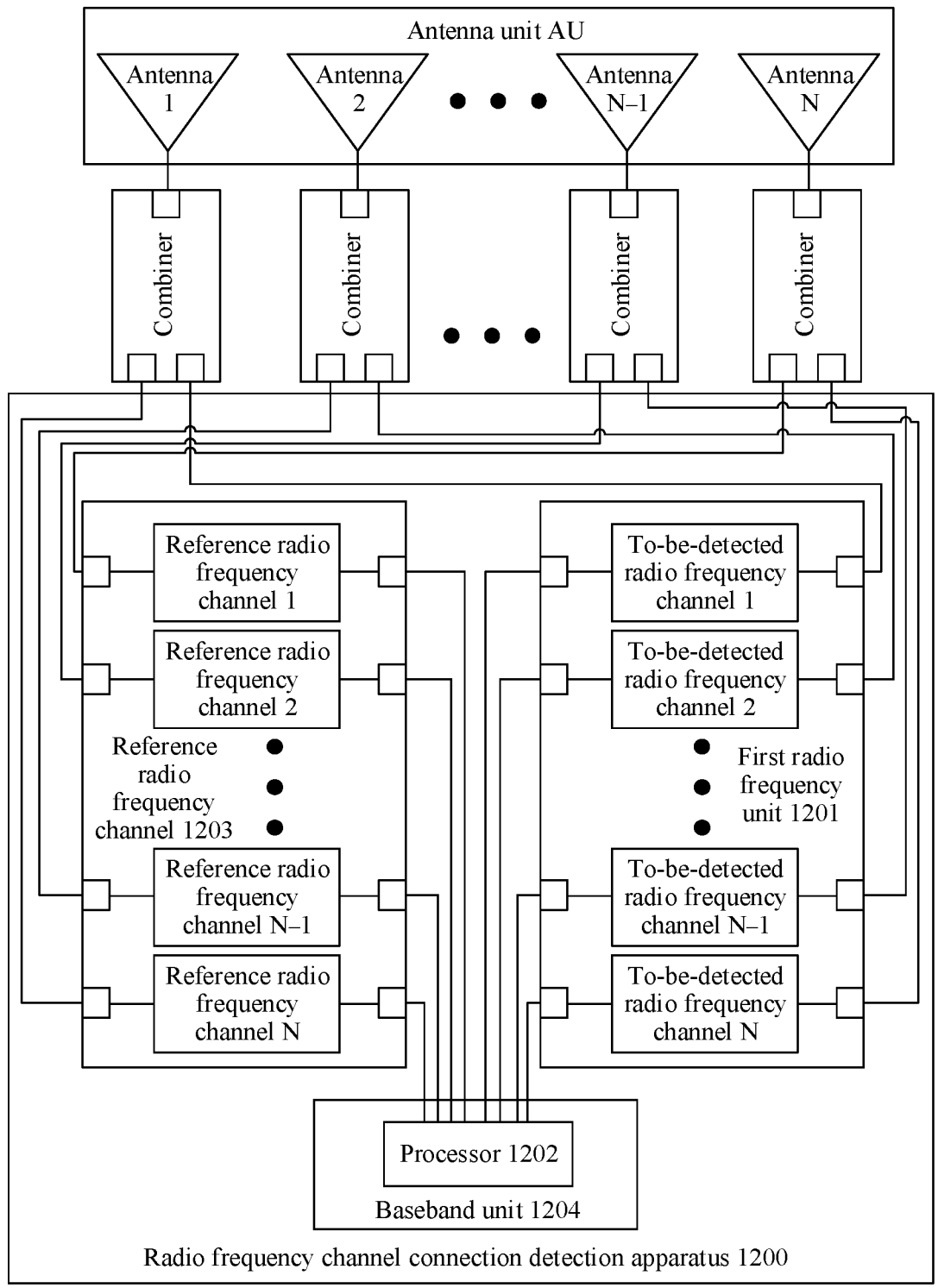
FIG. 14 is a schematic diagram of another radio frequency channel connection detection apparatus according to an embodiment of this application.
Figure 15:
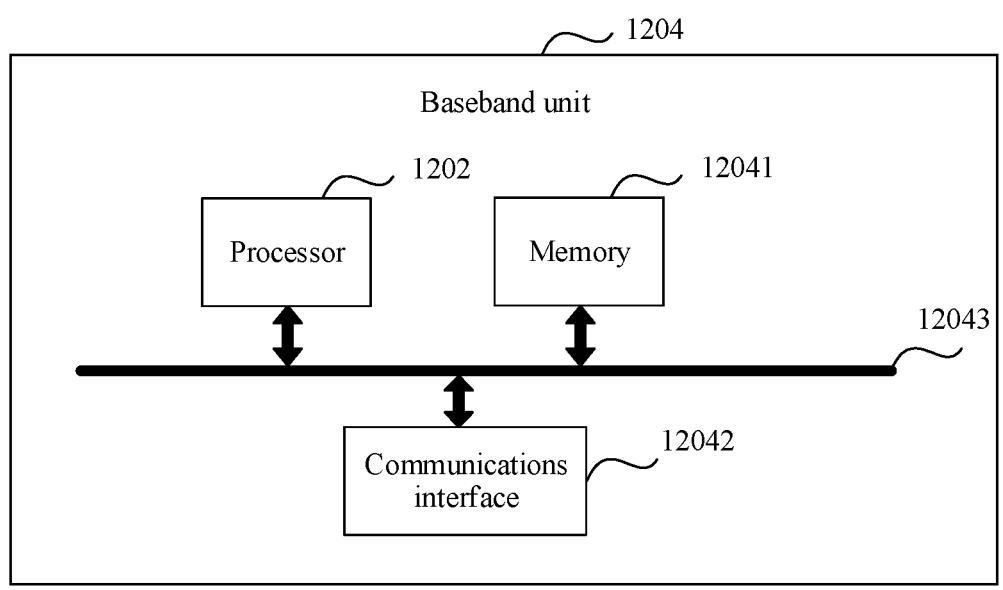
FIG. 15 is a schematic structural diagram of a baseband unit according to an embodiment of this application.

In a feasible implementation, as shown in FIG. 14, the radio frequency channel connection detection apparatus 1200 further includes a baseband unit BBU 1204, and the baseband unit 1204 includes the processor 1202. Optionally, as shown in FIG. 15, the baseband unit may further include a memory 12041 and a communications interface 12042. The baseband unit 1204 is connected to the N to-be-detected radio frequency channels by using the communications interface.

The memory 12041 is coupled to the processor 1202, and is configured to store a program and/or an instruction that are/is to be executed by the processor 1202.

The communications interface 12042 is configured to receive a signal sent by each to-be-detected radio frequency channel.

Each to-be-detected radio frequency channel is further configured to send the received signals to the baseband unit 1204.

It should be noted that the processor 1202 may be further configured to support another function of the BBU. The BBU may further include more other processors, configured to support other functions of the baseband unit.

In a feasible implementation, the first radio frequency unit 1201 is a passive radio frequency unit.

In a feasible implementation, the reference radio frequency unit 1203 is an active radio frequency unit or a passive radio frequency unit.

In a feasible implementation, the reference radio frequency unit 1203 and the first radio frequency unit 1201 are connected to a same baseband unit 1204.

Optionally, as shown in FIG. 15, the baseband unit 1204 may further include a bus system 12043. The processor 1202, the memory 12041, and the communications interface 12042 may be connected to each other by using the bus system 12043. The bus system 12043 may be a peripheral component interconnect (PCI) bus, an extended industry standard architecture (EISA) bus, or the like. The bus 12043 may be classified into an address bus, a data bus, a control bus, and the like. For ease of representation, only one thick line is used to represent the bus in FIG. 15, but this does not mean that there is only one bus or only one type of bus.

Optionally, the radio frequency channel connection detection apparatus 1200 may further include a bus system, a memory, a communications interface, and the like. Details are similar to those of the baseband unit, and details are not described herein again.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A radio frequency channel connection detection method, comprising:

receiving, by a first radio frequency unit using each of N to-be-detected radio frequency channels, one or more signals sent using at least one of N reference radio frequency channels of a reference radio frequency unit, wherein N is an integer greater than or equal to 2; and determining a connection relationship between the each of N to-be-detected radio frequency channels and N antennas based on the one or more signals received using the each of N to-be-detected radio frequency channels, wherein any one of the each of N to-be-detected radio frequency channels and one of the at least one of N reference radio frequency channels are connected to one of the N antennas using a combiner apparatus, and the N to-be-detected radio frequency channels are connected to different reference radio frequency channels and different antennas.

2. The method according to claim 1, wherein the determining a connection relationship between the each of N to-be-detected radio frequency channels and N antennas based on the one or more signals received using the each of N to-be-detected radio frequency channels comprises:

determining a connection relationship between at least one of the N to-be-detected radio frequency channels and at least one of the N reference radio frequency channels based on the one or more signals received using the each of N to-be-detected radio frequency channels; and determining the connection relationship between the each of N to-be-detected radio frequency channels and the N antennas based on the connection relationship between the at least one of the N to-be-detected radio frequency channels and the at least one of the N reference radio frequency channels.

3. The method according to claim 1, wherein the method further comprises:

sequentially sending signals using the N reference radio frequency channels; and the receiving, by a first radio frequency unit using each of N to-be-detected radio frequency channels, one or more signals sent using at least one of N reference radio frequency channels of a reference radio frequency unit comprises:

sequentially receiving, by the first radio frequency unit using the each of N to-be-detected radio frequency channels, the one or more signals sent using the at least one of N reference radio frequency channels.

4. The method according to claim 3, wherein the determining a connection relationship between the each of N to-be-detected radio frequency channels and N antennas based on the one or more signals received using the each of N to-be-detected radio frequency channels comprises:

determining a connection relationship between one of the N to-be-detected radio frequency channels and one of the N reference radio frequency channels based on a signal strength of a signal that is sent using the reference radio frequency channel and that is received using the each of N to-be-detected radio frequency channels, wherein a to-be-detected radio frequency channel on which a received signal has the strongest signal strength is connected to the reference radio frequency channel, and the to-be-detected radio frequency channel is connected to an antenna that is connected to the reference radio frequency channel.

5. The method according to claim 1, wherein the method further comprises:

simultaneously sending signals using the N reference radio frequency channels, wherein a feature of a signal sent using any one of the N reference radio frequency channels is different from a feature of a signal sent using another one of the N reference radio frequency channels; and the receiving, by a first radio frequency unit using each of N to-be-detected radio frequency channels, one or more signals sent using at least one of N reference radio frequency channels of a reference radio frequency unit comprises:

receiving, by the first radio frequency unit using the each of the N to-be-detected radio frequency channels, the one or more signals simultaneously sent using the at least one of N reference radio frequency channels.

6. The method according to claim 5, wherein the determining a connection relationship between the each of N to-be-detected radio frequency channels and N antennas based on the one or more signals received using the each of N to-be-detected radio frequency channels comprises:

determining a connection relationship between one of the N to-be-detected radio frequency channels and one of the N reference radio frequency channels based on signal strengths of signals that are in the one or more signals received using the each of N to-be-detected radio frequency channels and that have a same feature, wherein a to-be-detected radio frequency channel on which a signal having the strongest signal strength in the signals having the same feature is received is connected to the reference radio frequency channel, and the to-be-detected radio frequency channel is connected to an antenna that is connected to the reference radio frequency channel.

7. The method according to claim 1, wherein after the receiving, by a first radio frequency unit using each of N to-be-detected radio frequency channels, one or more signals sent using at least one of N reference radio frequency channels of a reference radio frequency unit, the method further comprises:

sending, by the first radio frequency unit, the one or more signals received using the each of N to-be-detected radio frequency channels to a baseband unit connected to the first radio frequency unit; and the determining a connection relationship between the each of N to-be-detected radio frequency channels and N antennas based on the one or more signals received using the each of N to-be-detected radio frequency channels comprises:

determining, by the baseband unit, the connection relationship between the each of N to-be-detected radio frequency channels and the N antennas based on the one or more signals received using the each of N to-be-detected radio frequency channel.

8. The method according to claim 1, wherein
the reference radio frequency unit is an active radio frequency unit, and the first radio frequency unit is a passive radio frequency unit; or both the reference radio frequency unit and the first radio frequency unit are passive radio frequency units.

9. The method according to claim 1, wherein the reference radio frequency unit and the first radio frequency unit are connected to a same baseband unit.

10. A radio frequency channel connection detection apparatus, comprising a first radio frequency unit, wherein the first radio frequency unit comprises N to-be-detected radio frequency channels, wherein any one of the N to-be-detected radio frequency channels and one of N reference radio frequency channels are connected to one of N antennas using a combiner apparatus, the N to-be-detected radio frequency channels are connected to different reference radio frequency channels and different antennas, and N is an integer greater than or equal to 2;

each of the N to-be-detected radio frequency channels is configured to receive signals sent using at least one of the N reference radio frequency channels; and the radio frequency channel connection detection apparatus further comprises a processor, wherein the processor is connected to the N to-be-detected radio frequency channels, and is configured to determine a connection relationship between the N to-be-detected radio frequency channels and the N antennas based on the signals received using each of the N to-be-detected radio frequency channels.

11. The radio frequency channel connection detection apparatus according to claim 10, wherein the processor is further configured to:

determine a connection relationship between at least one of the N to-be-detected radio frequency channels and at least one of the N reference radio frequency channels based on the signals received using each of the N to-be-detected radio frequency channels; and determine the connection relationship between the N to-be-detected radio frequency channels and the N antennas based on the connection relationship between the at least one of the N to-be-detected radio frequency channels and the at least one of the N reference radio frequency channels.

12. The radio frequency channel connection detection apparatus according to claim 10, further comprising a reference radio frequency unit, wherein the reference radio frequency unit comprises the N reference radio frequency channels;

the N reference radio frequency channels are configured to sequentially send signals; and each of the N to-be-detected radio frequency channels is further configured to sequentially receive the signals sent using the N reference radio frequency channels.

13. The radio frequency channel connection detection apparatus according to claim 12, wherein the processor is configured to:

determine a connection relationship between one of the N to-be-detected radio frequency channels and one of the N reference radio frequency channels based on a signal strength of a signal that is sent using the reference radio frequency channel and that is received using each to-be-detected radio frequency channel, wherein a to-be-detected radio frequency channel on which a received signal has the strongest signal strength is connected to the reference radio frequency channel, and the to-be-detected radio frequency channel is connected to an antenna that is connected to the reference radio frequency channel.

14. The radio frequency channel connection detection apparatus according to claim 10, further comprising a reference radio frequency unit, wherein the reference radio frequency unit comprises the N reference radio frequency channels;

the N reference radio frequency channels are configured to simultaneously send signals, wherein a feature of a signal sent using any one of the N reference radio frequency channels is different from a feature of a signal sent using another one of the N reference radio frequency channels; and each of the N to-be-detected radio frequency channels is configured to receive the signals simultaneously sent using the N reference radio frequency channels.

15. The radio frequency channel connection detection apparatus according to claim 14, wherein the processor is configured to:

determine a connection relationship between one of the N to-be-detected radio frequency channels and one of the N reference radio frequency channels based on signal strengths of signals that are in the signals received using each to-be-detected radio frequency channel and that have a same feature, wherein a to-be-detected radio frequency channel on which a signal having the strongest signal strength in the signals having the same feature is received is connected to the reference radio frequency channel, and the to-be-detected radio frequency channel is connected to an antenna that is connected to the reference radio frequency channel.

16. The radio frequency channel connection detection apparatus according to claim 10, further comprising a baseband unit, wherein the baseband unit comprises the processor, a memory, and a communications interface, and the baseband unit is connected to the N to-be-detected radio frequency channels using the communications interface;

the memory is coupled to the processor, and is configured to store a program or an instruction that is to be executed by the processor;

the communications interface is configured to receive a signal sent by each to-be-detected radio frequency channel; and each to-be-detected radio frequency channel is further configured to send the received signals to the baseband unit.

17. The radio frequency channel connection detection apparatus according to claim 10, wherein the first radio frequency unit is a passive radio frequency unit.

18. The radio frequency channel connection detection apparatus according to claim 10, wherein the reference radio frequency unit is an active radio frequency unit or a passive radio frequency unit.

19. The radio frequency channel connection detection apparatus according to claim 10, wherein the N reference radio frequency channels and the N to-be-detected radio frequency channels are connected to a same baseband unit.

* * * * *